(12) United States Patent
Shao et al.

(10) Patent No.: US 9,690,739 B2
(45) Date of Patent: Jun. 27, 2017

(54) METHOD AND APPARATUS FOR EXTENDING PCIE DOMAIN

(71) Applicant: Huawei Technologies Co., Ltd., Shenzhen (CN)

(72) Inventors: Wesley Shao, Shenzhen (CN); Muhui Lin, Hangzhou (CN); Lijiang Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 14/752,099

(22) Filed: Jun. 26, 2015

(65) Prior Publication Data

US 2015/0293873 A1 Oct. 15, 2015

Related U.S. Application Data

(63) Continuation of application No. PCT/CN2013/091227, filed on Dec. 31, 2013.

(51) Int. Cl.
*G06F 13/42* (2006.01)
*G06F 13/36* (2006.01)
*G06F 13/40* (2006.01)

(52) U.S. Cl.
CPC ........ *G06F 13/4045* (2013.01); *G06F 13/404* (2013.01); *G06F 13/4221* (2013.01); *G06F 2213/0026* (2013.01)

(58) Field of Classification Search
None
See application file for complete search history.

(56) References Cited

U.S. PATENT DOCUMENTS 7,320,043 B2 * 1/2008 Shatas ................. G06F 13/4045
710/105
7,334,071 B2 2/2008 Onufryk et al.
(Continued)

FOREIGN PATENT DOCUMENTS

CN 101206629 A 6/2008
CN 101242371 A 8/2008
(Continued)

OTHER PUBLICATIONS

Foreign Communication From a Counterpart Application, PCT Application No. PCT/CN2013/091227, English Translation of International Search Report dated Oct. 10, 2014, 2 pages.
(Continued)

*Primary Examiner* — Hyun Nam
(74) *Attorney, Agent, or Firm* — Conley Rose, P.C.

(57) ABSTRACT

A method for extending a Peripheral Component Interconnect Express (PCIe) domain. A configuration space address can be allocated to a PCIe device in an extended domain from a memory address of a root complex endpoint device, a correspondence between the configuration space address and a bus number/device number/function number (BDF) can be established, and a bus number can be allocated from a second bus set of the extended domain to a PCIe device discovered in the extended domain, where the bus number is used for determining the BDF of the PCIe device discovered in the extended domain, so as to access, according to the correspondence between the configuration space address and the BDF and by using the BDF of the PCIe device discovered in the extended domain, a configuration space register of the PCIe device discovered in the extended domain.

23 Claims, 8 Drawing Sheets

(56) References Cited

U.S. PATENT DOCUMENTS

| | | | |
|---|---|---|---|
| 8,429,325 | B1 | 4/2013 | Onufryk et al. |
| 2008/0147937 | A1 | 6/2008 | Freimuth et al. |
| 2008/0209099 | A1 | 8/2008 | Kloeppner et al. |
| 2011/0016235 | A1 | 1/2011 | Brinkmann et al. |
| 2011/0167190 | A1* | 7/2011 | Lin ............... G06F 13/385 710/313 |
| 2013/0346655 | A1* | 12/2013 | Glaser ............. G06F 13/385 710/105 |
| 2014/0189179 | A1 | 7/2014 | Chen et al. |
| 2015/0006780 | A1 | 1/2015 | Shao |
| 2015/0082080 | A1* | 3/2015 | Lin ............... G06F 11/0745 714/5.1 |
| 2015/0096051 | A1 | 4/2015 | Natu et al. |

FOREIGN PATENT DOCUMENTS

| | | |
|---|---|---|
| CN | 101669082 A | 3/2010 |
| CN | 103069771 A | 4/2013 |
| CN | 103092798 A | 5/2013 |
| CN | 103117929 A | 5/2013 |

OTHER PUBLICATIONS

Foreign Communication From a Counterpart Application, PCT Application No. PCT/CN2013/091227, Written Opinion dated Oct. 10, 2014, 5 pages.

Foreign Communication From a Counterpart Application, Chinese Application No. 201380002531.8, Chinese Search Report dated Oct. 20, 2016, 2 pages.

Foreign Communication From a Counterpart Application, Chinese Application No. 201380002531.8, Chinese Issue Notification dated Nov. 15, 2016, 1 page.

Foreign Communication From a Counterpart Application, Chinese Application No. 201380002531.8, Chinese Notice of Allowance dated Nov. 15, 2016, 1 page.

Foreign Communication From a Counterpart Application, European Application No. 13899977.6, Extended European Search Report dated Mar. 14, 2016, 7 pages.

Foreign Communication From a Counterpart Application, Chinese Application No. 201380002531.8, Chinese Office Action dated May 4, 2016, 15 pages.

Foreign Communication From a Counterpart Application, Chinese Application No. 201380002531.8, Chinese Search Report dated Apr. 16, 2016, 3 pages.

* cited by examiner

METHOD AND APPARATUS FOR EXTENDING PCIE DOMAIN

CROSS-REFERENCE TO RELATED APPLICATION

This application is a continuation of International Application No. PCT/CN2013/091227, filed on Dec. 31, 2013, which is hereby incorporated by reference in its entirety.

TECHNICAL FIELD

Embodiments of the present invention relate to computer technologies, and in particular, to a method and an apparatus for extending a peripheral component interconnect express (PCIe) domain.

BACKGROUND

A PCIe bus technology is a high-performance bus technology that is used for interconnection between a processor and a peripheral device. A PCIe bus uses a point-to-point serial connection, can provide a higher connection speed with fewer data lines when compared with a PCI bus, and is widely applied to a built-in device of a desktop computer, a notebook computer, a server, communications and a workstation, and the like.

One PCIe domain usually includes a root complex (Root Complex), a switch (Switch), an endpoint (Endpoint), and a bridge (PCIe bridge). The root complex is used for connection between a processor and an input/output (I/O) device; the switch supports peer-to-peer communications between different endpoints; the bridge is used for connecting the PCIe to another PCI bus standard (such as PCI/PCI-X); the endpoint is a PCIe endpoint device, such as a PCIe network interface card device, a serial port card device, or a storage card device. However, according to PCIe bus specifications, one PCIe domain has only 256 PCIe buses at most; each PCIe bus includes 32 PCIe device numbers at most; each device number includes eight function numbers at most; each function number corresponds to one PCIe device at most. Therefore, in an existing PCIe domain system, the number of PCIe devices is restricted by 256 buses.

SUMMARY

Embodiments of the present invention provide a method and an apparatus for extending a PCIe domain, which can extend a PCIe domain.

According to a first aspect, an embodiment of the present invention provides a method for extending a PCIe domain, where the method is used for a system including a primary domain and an extended domain, where the primary domain includes a root complex and a PCIe device, where the PCIe device in the primary domain has a first bus set; and the extended domain includes a root complex endpoint device and a PCIe device, where the PCIe device in the extended domain has a second bus set, the first bus set is different from the second bus set, and the root complex endpoint device is the PCIe device in the primary domain and a root complex in the extended domain; and the method includes: allocating a configuration space address to the PCIe device in the extended domain from a memory address of the root complex endpoint device, and establishing a correspondence between the configuration space address and a bus number/device number/function number (BDF), and allocating, from the second bus set, a bus number to a PCIe device discovered in the extended domain, where the bus number is used for determining a BDF of the PCIe device discovered in the extended domain, so as to implement, according to the correspondence between the configuration space address and the BDF and by using the BDF of the PCIe device discovered in the extended domain, configuration space access of the PCIe device discovered in the extended domain.

With reference to the first aspect, in a first possible implementation manner, the method further includes: allocating, from the memory address of the root complex endpoint device, a first memory-mapped I/O address to the PCIe device discovered in the extended domain; and allocating, according to the first memory-mapped input/output address, a second memory-mapped I/O address to the PCIe device discovered in the extended domain, so as to implement, according to a mapping between the first memory-mapped input/output address and the second memory-mapped input/output address, memory-mapped input/output access of the PCIe device discovered in the extended domain.

With reference to the first possible implementation manner of the first aspect, in a second possible implementation manner, the memory address of the root complex endpoint device specifically refers to a memory-mapped I/O address of the root complex endpoint device.

With reference to the first possible implementation manner or the second possible implementation manner of the first aspect, in a third possible implementation manner, after the allocating a configuration space address to the PCIe device in the extended domain from a memory address of the root complex endpoint device, the method further includes: discovering the PCIe device in the extended domain by using the configuration space address of the PCIe device in the extended domain and the correspondence between the configuration space address and the BDF.

With reference to the first possible implementation manner, the second possible implementation manner or the third possible implementation manner of the first aspect, in a fourth possible implementation manner, the allocating, according to the first memory-mapped I/O address, a second memory-mapped I/O address to the PCIe device discovered in the extended domain includes: establishing the mapping between the first memory-mapped I/O address and the second memory-mapped I/O address; and allocating, according to the mapping between the first memory-mapped I/O address and the second memory-mapped I/O address, the second memory-mapped input/output address to the PCIe device discovered in the extended domain.

With reference to the first aspect or any one of the first to the fourth possible implementation manners of the first aspect, in a fifth possible implementation manner, the method further includes: allocating a first message signaled interrupts address to the PCIe device in the extended domain from the memory address of the root complex endpoint device; and allocating a second message signaled interrupts address to the PCIe device in the extended domain according to the first message signaled interrupts address, so as to implement message signaled interrupts access of the PCIe device in the extended domain according to a mapping between the first message signaled interrupts address and the second message signaled interrupts address.

With reference to the first aspect or any one of the first to the fourth possible implementation manners of the first aspect, in a sixth possible implementation manner, the method further includes: allocating a first direct memory access address to the PCIe device in the extended domain from the memory address of the root complex endpoint device; and allocating a second direct memory access address to the PCIe device in the extended domain according to the first direct memory access address, so as to implement direct memory access of the PCIe device in the extended domain according to a mapping between the first direct memory access address and the second direct memory access address.

According to a second aspect, an embodiment of the present invention provides a method for accessing a PCIe domain, where the method is used for a system including a primary domain and an extended domain, where the primary domain includes a root complex and a PCIe device, where the PCIe device in the primary domain has a first bus set; and the extended domain includes a root complex endpoint device and a PCIe device, where the PCIe device in the extended domain has a second bus set, the first bus set is different from the second bus set, and the root complex endpoint device is the PCIe device in the primary domain and a root complex in the extended domain, and the method includes receiving, by the root complex endpoint device, an access packet, where the access packet is a packet for mutual communication between the primary domain and the extended domain, and the access packet carries a message body and an access target address, performing, by the root complex endpoint device, address translation on the access target address according to an address mapping, to obtain a translated access target address, where the address mapping is pre-saved in the root complex endpoint device, and sending, by the root complex endpoint device, an analog access packet corresponding to the access packet, where the analog access packet carries the message body and the translated access target address.

With reference to the second aspect, in a first possible implementation manner, the access target address is a configuration space address of the PCIe device in the extended domain, and the address mapping is a correspondence between the configuration space address and a BDF of the PCIe device in the extended domain; and the performing, by the root complex endpoint device, address translation on the access target address according to an address mapping, to obtain a translated access target address includes: performing, by the root complex endpoint device, address translation on the configuration space address of the PCIe device in the extended domain according to the correspondence between the configuration space address and the BDF of the PCIe device in the extended domain, to obtain the BDF of the PCIe device in the extended domain.

With reference to the second aspect, in a second possible implementation manner, the access target address is a first memory-mapped I/O address of the PCIe device in the extended domain, and the address mapping is a mapping between the first memory-mapped I/O address and a second memory-mapped I/O address of the PCIe device in the extended domain; and the performing, by the root complex endpoint device, address translation on the access target address according to an address mapping, to obtain a translated access target address includes: performing, by the root complex endpoint device, address translation on the first memory-mapped I/O address of the PCIe device in the extended domain according to the mapping between the first memory-mapped I/O address and the second memory-mapped I/O address of the PCIe device in the extended domain, to obtain the second memory-mapped I/O address of the PCIe device in the extended domain.

With reference to the second aspect, in a third possible implementation manner, the access target address is a second message signaled interrupts address of the PCIe device in the extended domain, and the address mapping is a mapping between a first message signaled interrupts address and the second message signaled interrupts address of the PCIe device in the extended domain; and the performing, by the root complex endpoint device, address translation on the access target address according to an address mapping, to obtain a translated access target address includes: performing, by the root complex endpoint device, address translation on the second message signaled interrupts address of the PCIe device in the extended domain according to the mapping between the first message signaled interrupts address and the second message signaled interrupts address of the PCIe device in the extended domain, to obtain the first message signaled interrupts address of the PCIe device in the extended domain.

With reference to the second aspect, in a fourth possible implementation manner, the access target address is a second direct memory access address of the PCIe device in the extended domain, and the address mapping is a mapping between a first direct memory access address and the second direct memory access address of the PCIe device in the extended domain; and the performing, by the root complex endpoint device, address translation on the access target address according to an address mapping, to obtain a translated access target address includes: performing, by the root complex endpoint device, address translation on the second direct memory access address of the PCIe device in the extended domain according to the mapping between the first direct memory access address and the second direct memory access address of the PCIe device in the extended domain, to obtain the first direct memory access address of the PCIe device in the extended domain.

According to a third aspect, an embodiment of the present invention provides an apparatus for extending a PCIe domain, where the apparatus is used for a system including a primary domain and an extended domain, where the primary domain includes a root complex and a PCIe device, where the PCIe device in the primary domain has a first bus set; and the extended domain includes the apparatus and a PCIe device, where the PCIe device in the extended domain has a second bus set, the first bus set is different from the second bus set, and the apparatus is the PCIe device in the primary domain and a root complex in the extended domain, and the apparatus includes a first-type address allocating unit configured to allocate a configuration space address to the PCIe device in the extended domain from a memory address of a root complex endpoint device, and establish a correspondence between the configuration space address and a BDF, and a bus allocating unit, allocating, from the second bus set, a bus number to a PCIe device discovered in the extended domain, where the bus number is used for determining a BDF of the PCIe device discovered in the extended domain, so as to implement, according to the correspondence between the configuration space address and the BDF and by using the BDF of the PCIe device discovered in the extended domain, configuration space access of the PCIe device discovered in the extended domain.

With reference to the third aspect, in a first possible implementation manner, the apparatus further includes: a second-type address allocating unit configured to allocate, from the memory address of the root complex endpoint device, a first memory-mapped I/O address to the PCIe device discovered in the extended domain, and allocate, according to the first memory-mapped I/O address, a second memory-mapped I/O address to the PCIe device discovered in the extended domain, so as to implement, according to a mapping between the first memory-mapped I/O address and the second memory-mapped I/O address, memory-mapped I/O access of the PCIe device discovered in the extended domain.

With reference to the first possible implementation manner of the third aspect, in a second possible implementation manner, the memory address of the root complex endpoint device specifically refers to a memory-mapped I/O address of the root complex endpoint device.

With reference to the first possible implementation manner or the second possible implementation manner of third aspect, in a third possible implementation manner, the apparatus further includes: a determining unit configured to discover the PCIe device in the extended domain by using the configuration space address of the PCIe device in the extended domain and the correspondence between the configuration space address and the BDF.

With reference to the first possible implementation manner, the second possible implementation manner or the third possible implementation manner of the third aspect, in a fourth possible implementation manner, the second-type address allocating unit is specifically configured to establish the mapping between the first memory-mapped I/O address and the second memory-mapped I/O address, and allocate, according to the mapping between the first memory-mapped I/O address and the second memory-mapped input/output address, the second memory-mapped I/O address to the PCIe device discovered in the extended domain.

With reference to the third aspect or any one of the first to the fourth possible implementation manners of the third aspect, in a fifth possible implementation manner, the apparatus further includes: a third-type address allocating unit configured to allocate a first message signaled interrupts address to the PCIe device in the extended domain from the memory address of the root complex endpoint device, and allocate a second message signaled interrupts address to the PCIe device in the extended domain according to the first message signaled interrupts address, so as to implement message signaled interrupts access of the PCIe device in the extended domain according to a mapping between the first message signaled interrupts address and the second message signaled interrupts address.

With reference to the third aspect or any one of the first to the fourth possible implementation manners of the third aspect, in a sixth possible implementation manner, the apparatus further includes: a fourth-type address allocating unit configured to allocate a first direct memory access address to the PCIe device in the extended domain from the memory address of the root complex endpoint device, and allocate a second direct memory access address to the PCIe device in the extended domain according to the first direct memory access address, so as to implement direct memory access of the PCIe device in the extended domain according to a mapping between the first direct memory access address and the second direct memory access address.

According to a fourth aspect, an embodiment of the present invention provides an apparatus for accessing a PCIe domain, where the apparatus is used for a system including a primary domain and an extended domain, where the primary domain includes a root complex and a PCIe device, where the PCIe device in the primary domain has a first bus set; and the extended domain includes the apparatus and a PCIe device, where the PCIe device in the extended domain has a second bus set, the first bus set is different from the second bus set, and the apparatus is the PCIe device in the primary domain and a root complex in the extended domain, and the apparatus includes a receiving unit configured to receive an access packet, where the access packet is a packet for mutual communication between the primary domain and the extended domain, and the access packet carries a message body and an access target address, a translation unit configured to perform address translation on the access target address according a pre-saved address mapping, to obtain a translated access target address, and a sending unit configured to send an analog access packet corresponding to the access packet, where the analog access packet carries the message body and the translated access target address.

With reference to the fourth aspect, in a first possible implementation manner, the access target address is a configuration space address of the PCIe device in the extended domain, and the address mapping is a correspondence between the configuration space address and a BDF of the PCIe device in the extended domain; and the translation unit is specifically configured to perform address translation on the configuration space address of the PCIe device in the extended domain according to the correspondence between the configuration space address and the BDF of the PCIe device in the extended domain, to obtain the BDF of the PCIe device in the extended domain.

With reference to the fourth aspect, in a second possible implementation manner, the access target address is a first memory-mapped I/O address of the PCIe device in the extended domain, and the address mapping is a mapping between the first memory-mapped I/O address and a second memory-mapped I/O address of the PCIe device in the extended domain; and the translation unit is specifically configured to perform address translation on the first memory-mapped I/O address of the PCIe device in the extended domain according to the mapping between the first memory-mapped I/O address and the second memory-mapped I/O address of the PCIe device in the extended domain, to obtain the second memory-mapped I/O address of the PCIe device in the extended domain.

With reference to the fourth aspect, in a third possible implementation manner, the access target address is a second message signaled interrupts address of the PCIe device in the extended domain, and the address mapping is a mapping between a first message signaled interrupts address and the second message signaled interrupts address of the PCIe device in the extended domain; and the translation unit is specifically configured to perform address translation on the second message signaled interrupts address of the PCIe device in the extended domain according to the mapping between the first message signaled interrupts address and the second message signaled interrupts address of the PCIe device in the extended domain, to obtain the first message signaled interrupts address of the PCIe device in the extended domain.

With reference to the fourth aspect, in a fourth possible implementation manner, the access target address is a second direct memory access address of the PCIe device in the extended domain, and the address mapping is a mapping between a first direct memory access address and the second direct memory access address of the PCIe device in the extended domain; and the translation unit is specifically configured to perform address translation on the second direct memory access address of the PCIe device in the extended domain according to the mapping between the first direct memory access address and the second direct memory access address of the PCIe device in the extended domain, to obtain the first direct memory access address of the PCIe device in the extended domain.

In the embodiments of the present invention, a configuration space address can be allocated to a PCIe device in an extended domain from a memory address of a root complex endpoint device, a correspondence between the configuration space address and a BDF can be established, and a bus number can be allocated from a second bus set of the extended domain to a PCIe device discovered in the extended domain, where the bus number is used for determining a BDF of the PCIe device discovered in the extended domain, so as to access, according to the correspondence between the configuration space address and the BDF and by using the BDF of the PCIe device discovered in the extended domain, a configuration space register of the PCIe device discovered in the extended domain, which implements configuration space access of the PCIe device discovered in the extended domain, implements extension of a PCIe domain, and solves a problem in the prior art that a PCIe domain cannot be extended, so that the number of PCIe devices in a system is not restricted by 256 buses, thereby implementing communication for the extended domain.

In the embodiments of the present invention, the root complex endpoint device can receive an access packet, where the access packet is a packet for mutual communication between a primary domain and an extended domain; perform address translation on an access target address of the access packet according to a pre-saved address mapping, for example, translate a memory address of the primary domain into a memory address of the extended domain; and send an analog access packet corresponding to the access packet, where the analog access packet carries a translated access target address, so that the primary domain can access a PCIe device in the extended domain, or the PCIe device in the extended domain can access the primary domain, thereby implementing extension of a PCIe domain, and implementing communication between the extended domain and the primary domain.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a method and an apparatus for extending a PCIe domain, which can extend a PCIe domain, implement communication between a primary PCIe domain and the extended PCIe domain, and solve a problem in the prior art that a PCIe domain cannot be extended, so that the number of PCIe devices in a system is not restricted by 256 buses.

Figure 1:
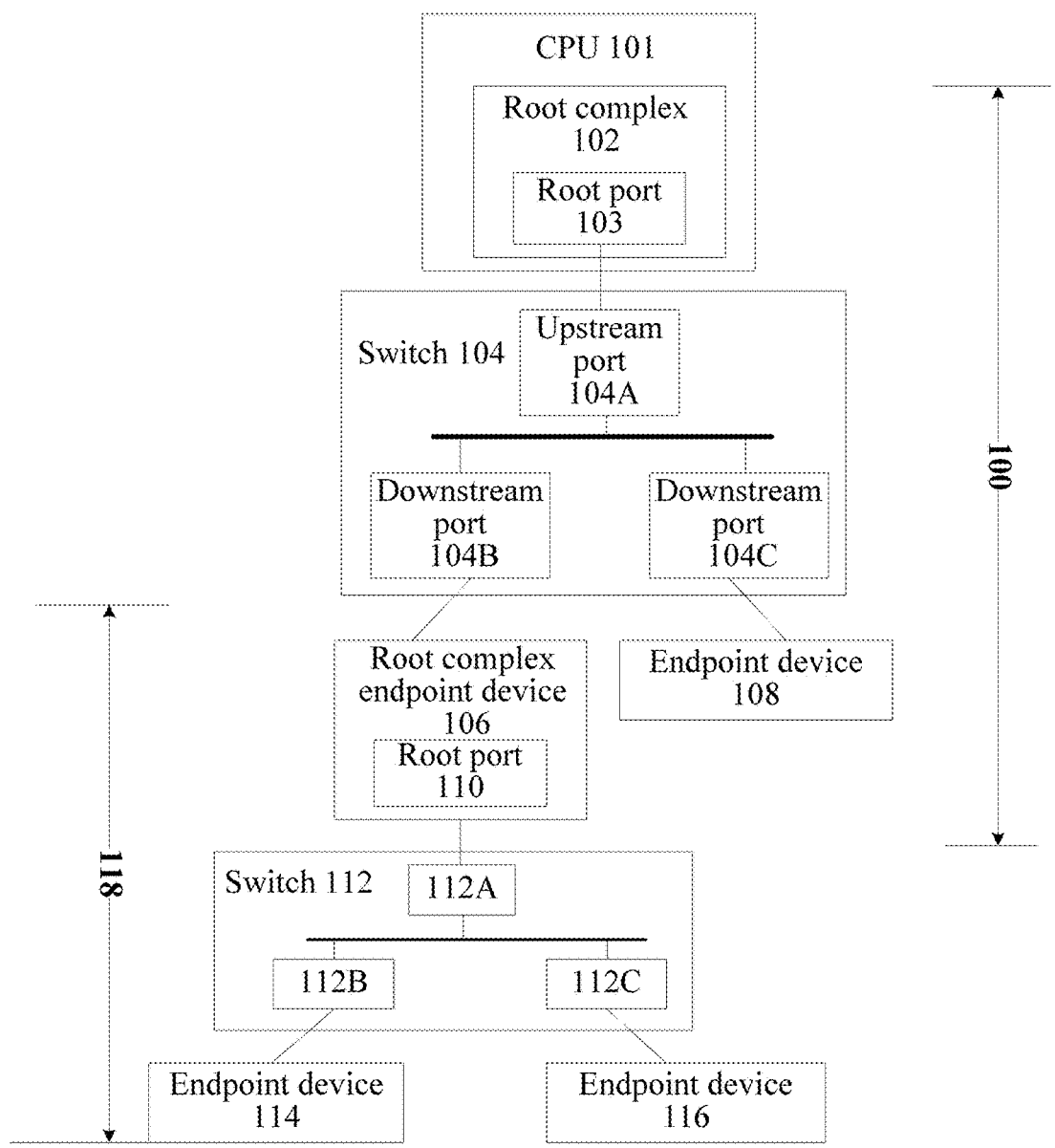
FIG. 1 is a diagram of a system architecture according to an embodiment of the present invention.

FIG. 1 shows an example of a system in the embodiments of the present invention. The system includes a primary PCIe domain 100 (briefly referred to as a primary domain 100 subsequently for the convenience of description), and the primary domain 100 includes a root complex (RC) 102, a switch (Switch) 104, and at least one PCIe endpoint device. FIG. 1 shows two PCIe endpoint devices, namely, an endpoint device 106 and an endpoint device 108. The root complex 102 is connected to an upstream port 104A of the switch 104 by using a root port 103; downstream ports 104B and 104C of the switch 104 are connected to the endpoint device 106 and the endpoint device 108; the root complex 102 may be integrated onto a Central Processing Unit (CPU) 101 in the system, and the CPU 101 may be a set of multiple CPUs. The root complex 102 is configured to process and forward an access packet between the CPU 101 and the endpoint devices 106 and 108, such as a configuration space access packet, a message signaled interrupts (MSI) access packet, a memory-mapped input/output (MMIO) access packet, or a direct memory access (DMA) access packet; the switch 104 is configured to route the access packet downstream to the PCIe endpoint device connected to the downstream port 104B or 104C, and route the access packet upstream from each independent downstream port to a single root complex; the endpoint devices 106 and 108 have functions of initiating a request and completing PCIe transaction handling, and the endpoint devices 106 and 108 may be storage devices, network adapters, or audio adapters, or the like. In the figure, one switch is used as an example in the primary domain 100; in another embodiment, the primary domain 100 may further include multiple switches, and each switch may be connected to one or more PCIe endpoint devices.

PCIe devices in the primary domain may be classified into two types: one is a bridge device, such as the root port 103, the upstream port 104A, and the downstream ports 104B and 104C; the other is an endpoint device, such as the endpoint device 106 and the endpoint device 108. When executing an instruction of the system, the CPU 101 may load a device driver of the root complex 102, and allocate a memory address and a bus to a bridge device and an endpoint device in the primary domain according to the device driver, thereby implementing mutual communication between the CPU 101 and the PCIe devices in the primary domain and mutual communication between the PCIe devices in the primary domain. Specifically, memory addresses allocated to the PCIe devices in the primary domain may be classified into four types, namely a configuration space address, an MMIO address, an MSI address, and a DMA address; therefore, the CPU 101 may perform configuration space access and MMIO access of the PCIe devices in the primary domain by using configuration space addresses and MMIO addresses of the PCIe devices in the primary domain, and the PCIe devices in the primary domain may perform DMA access by using allocated DMA addresses, thereby implementing mutual access between the PCIe devices; the PCIe devices in the primary domain may also request message signaled interrupts from the CPU by using MSI addresses.

In addition, for the convenience of description, a set of buses allocated to the PCIe devices in the primary domain may be referred to as a first bus set. According to PCIe specifications, the first bus set includes 256 buses at most, and the number of PCIe devices in the primary domain are restricted by 256 buses.

In the embodiments of the present invention, to extend a PCIe domain so that the number of PCIe devices in the system is not restricted, function enhancement is performed on the endpoint device 106 in the system, so that the endpoint device 106 becomes a root complex endpoint (RCEP) device 106; the PCIe domain is extended by using the RCEP 106, to obtain an extended PCIe domain 118 (briefly referred to as an extended domain 118 subsequently for the convenience of description), where the RCEP 106 serves as an endpoint device in the primary domain 100 and also serves as a root complex in the extended domain 118, that is, the RCEP 106 not only can initiate an access packet and complete PCIe transaction handling, but also can manage and forward an access packet between the extended domain 118 and the primary domain 100, thereby implementing communication connection between the primary domain and the extended domain. As shown in FIG. 1, the extended domain 118 may include: the RCEP 106, a switch 112, and endpoint devices 114 and 116 (there may be one or more endpoint devices in the extended domain, and two endpoint devices are used as an example in the embodiments of the present invention). The endpoint devices 114 and 116 are connected to a bridge device 110 in the RCEP 106 by using the switch 112. There may be multiple root ports 110 and multiple switches 112 in the extended domain 118, and FIG. 1 is only one example of the embodiments of the present invention. The endpoint devices 114 and 116, and bridge devices 112A, 112B, and 112C in the figure are PCIe devices in the extended domain. The extended domain 118 is obtained by means of extension by using the RCEP in the system, and the number of PCIe devices in the system can be increased, so that the number of PCIe devices in the system is not restricted by 256 buses.

Further, in the system shown in FIG. 1, the RCEP 106 is isolated from the PCIe devices in the extended domain in a hardware manner, and therefore the CPU 101 in the system or the PCIe devices in the primary domain cannot communicate with the extended domain 118. Therefore, in the embodiments of the present invention, a device driver of the RCEP 106 may also be configured. Then, when executing an instruction of the system, for example, executing an instruction of an operating system or a basic I/O system of the system, the CPU 101 may load the device driver of the RCEP 106, and may execute the following operations according to the device driver of the RCEP: allocating a configuration space address to a PCIe device in the extended domain from a memory address of the RCEP 106, establishing a correspondence between the configuration space address and a BDF, and allocating a bus number to a PCIe device discovered in the extended domain, where the bus number is used for determining a BDF of the PCIe device discovered in the extended domain, so as to access, by using the BDF of the PCIe device discovered in the extended domain, a configuration space register of the PCIe device discovered in the extended domain, which implements configuration space access of the PCIe device discovered in the extended domain, completes extension of a PCIe domain, implements communication between the CPU or the primary domain and the extended domain, and solves a problem in the prior art that a PCIe domain cannot be extended, so that the number of PCIe devices in the system is not restricted by 256 buses.

Further, in the embodiments of the present invention, function enhancement may also be performed on the RCEP 106, so that the RCEP 106 may execute the following method: receiving an access packet, where the access packet is a packet for mutual communication between the primary domain and the extended domain; performing address translation on an access target address of the access packet according to a pre-saved address mapping, for example, translating a memory address of the primary domain into a memory address of the extended domain; and sending an analog access packet corresponding to the access packet, where the analog access packet carries a translated access target address, so that the primary domain or the CPU can access a PCIe device in the extended domain, or a PCIe device in the extended domain can access the primary domain or the CPU, thereby implementing communication between the CPU in the system or the primary domain and the extended domain.

For details of a specific implementation manner, refer to the following embodiments.

Method for Extending a PCIe Domain

Figure 2:
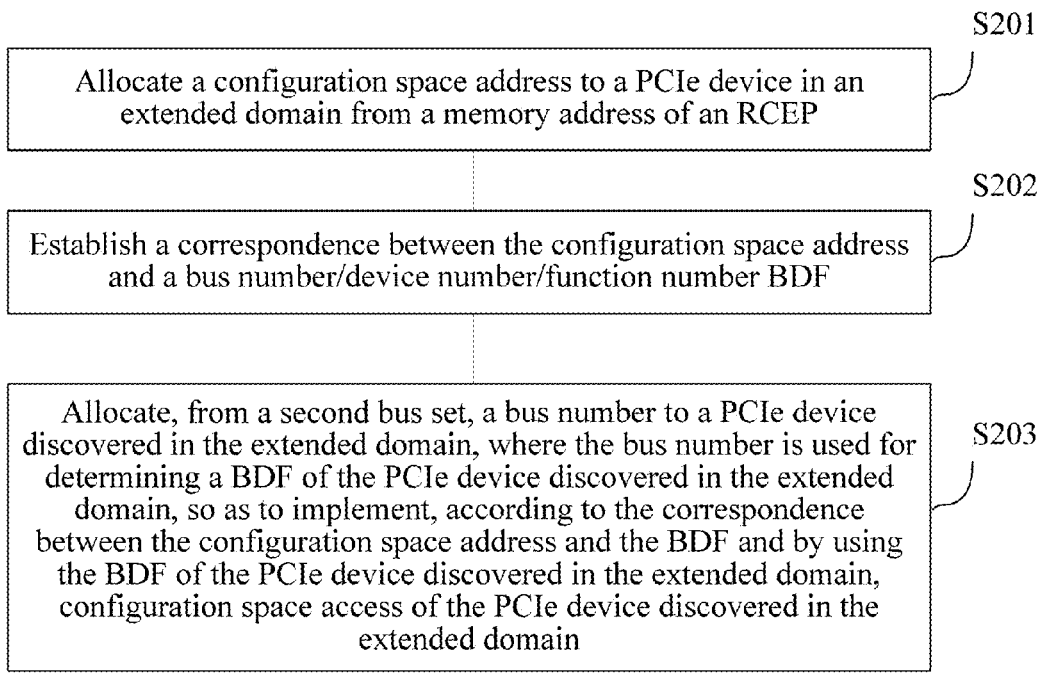
FIG. 2 is a flowchart of a method according to an embodiment of the present invention.

With reference to the system shown in FIG. 1, an embodiment of the present invention provides a method for extending a PCIe domain. As shown in FIG. 2, the method is used for a system including a primary domain and an extended domain, where the primary domain includes a root complex and a PCIe device, where the PCIe device in the primary domain has a first bus set; and the extended domain includes a root complex endpoint device and a PCIe device, where the PCIe device in the extended domain has a second bus set, the first bus set is different from the second bus set, and the root complex endpoint device is the PCIe device in the primary domain and a root complex in the extended domain. The method includes:

S201: Allocate a configuration space address to the PCIe device in the extended domain from a memory address of the RCEP.

A PCIe domain is extended by using the RCEP in the system, and the RCEP is isolated from the PCIe device in the extended domain in a hardware manner, so that a CPU in the system or the PCIe device in the primary domain cannot identify the PCIe device in the extended domain. Therefore a memory address may be allocated as the configuration space address of the PCIe device in the extended domain from the memory address of the RCEP, so as to map the PCIe device in the extended domain to the primary domain; when configuration space access is performed, the configuration space address can represent, in the primary domain, the PCIe device in the extended domain, so that the CPU or the PCIe device in the primary domain may identify the PCIe device in the extended domain, which brings convenience to subsequent configuration space access of the PCIe device in the extended domain.

S202: Establish a correspondence between the configuration space address and a BDF.

The extended domain includes the second bus set; each bus number in the second bus set may include 32 device numbers at most; each device number may include 8 function numbers at most; a BDF in the extended domain may be determined according to the bus number, the device number, and the function number.

Because each function number corresponds to one PCIe device at most, a configuration space register of the PCIe device in the extended domain may be accessed by using a BDF of the PCIe device in the extended domain, that is, configuration space access of the PCIe device in the extended domain is performed. Therefore, a correspondence between the configuration space address and the BDF is established, that is, a correspondence between the configuration space address and the configuration space register of the PCIe device in the extended domain is established, so that configuration space access of the PCIe device in the extended domain may be performed according to the correspondence between the configuration space address and the BDF and by using the configuration space address of the PCIe device in the extended domain, so as to discover the PCIe device in the extended domain.

S203: Allocate, from the second bus set, a bus number to a PCIe device discovered in the extended domain, where the bus number is used for determining a BDF of the PCIe device discovered in the extended domain, so as to implement, according to the correspondence between the configuration space address and the BDF and by using the BDF of the PCIe device discovered in the extended domain, configuration space access of the PCIe device discovered in the extended domain.

The bus number is allocated from the second bus set to the PCIe device discovered in the extended domain; a device number (Device Number) and a function number (Function Number) of the PCIe device discovered in the extended domain are enumerated, and a BDF of each PCIe device is different; therefore, the BDF of the PCIe device discovered in the extended domain may be determined according to the bus number, so as to determine a configuration space address of the PCIe device discovered in the extended domain, so that when configuration space access of the PCIe device discovered in the extended domain is performed subsequently, address translation may be performed according to the correspondence between the configuration space address and the BDF and by using the configuration space address of the PCIe device discovered in the extended domain, to obtain the BDF of the PCIe device discovered in the extended domain, and a configuration space register of the PCIe device discovered in the extended domain is accessed by using the BDF of the PCIe device discovered in the extended domain, thereby implementing configuration space access of the PCIe device discovered in the extended domain.

In this embodiment of the present invention, the configuration space address is allocated to the PCIe device in the extended domain from the memory address of the RCEP, the correspondence between the configuration space address and the BDF is established, and the bus number is allocated from the second bus set of the extended domain to the PCIe device discovered in the extended domain, where the bus number is used for determining the BDF of the PCIe device discovered in the extended domain, so as to access, according to the correspondence between the configuration space address and the BDF and by using the BDF of the PCIe device discovered in the extended domain, the configuration space register of the PCIe device discovered in the extended domain, which implements configuration space access of the PCIe device discovered in the extended domain, completes extension of a PCIe domain, implements communication between the CPU or the primary domain and the extended domain, and solves a problem in the prior art that a PCIe domain cannot be extended, so that the number of PCIe devices in the system is not restricted by 256 buses.

Specific Embodiments

Figure 3A:
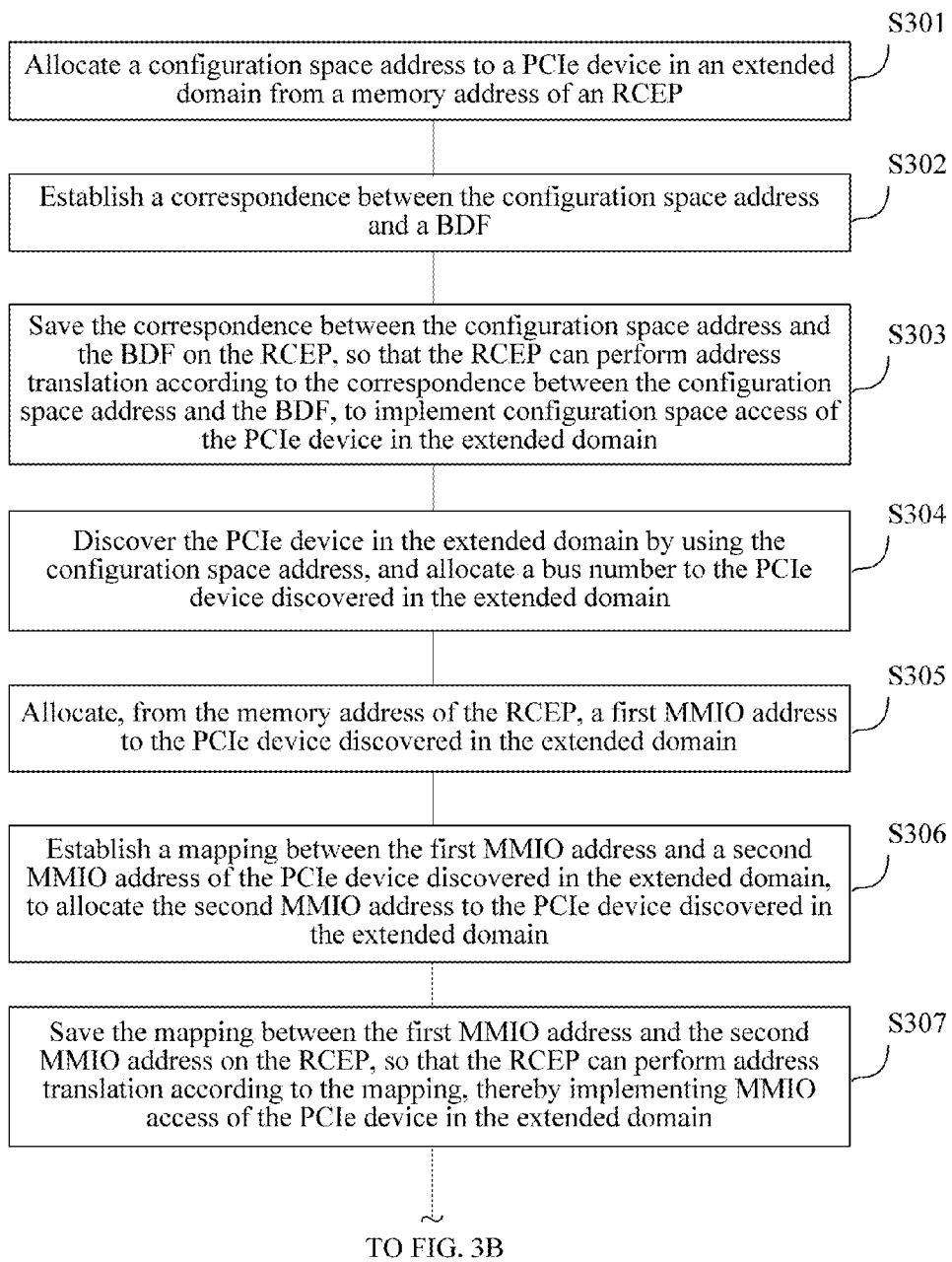
FIG. 3A and FIG. 3B are a flowchart of another method according to an embodiment of the present invention.
Figure 3B:
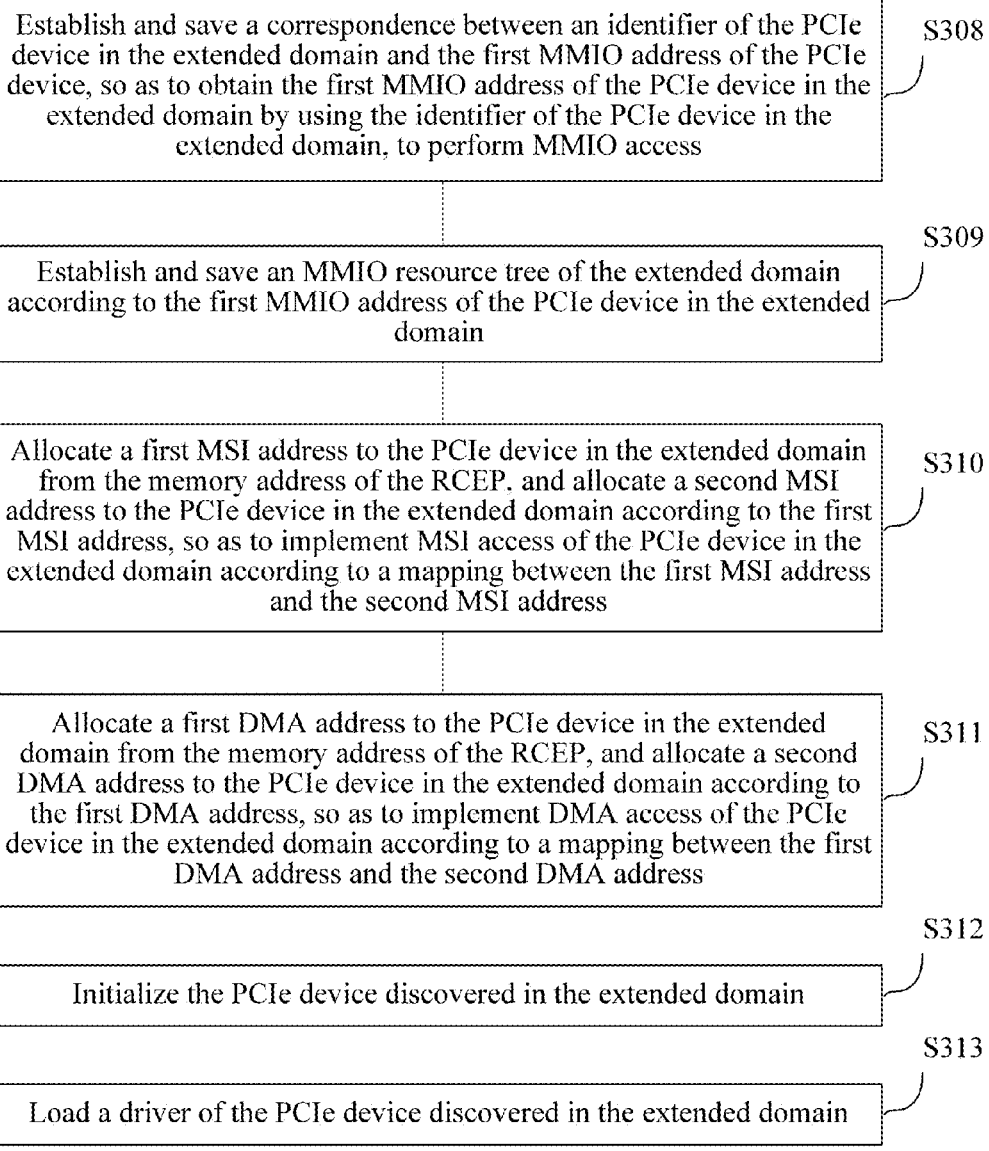

With reference to the system shown in FIG. 1, an embodiment of the present invention provides a method for extending a PCIe domain. As shown in FIG. 3A and FIG. 3B, the method is used for a system including a primary domain and an extended domain, where the primary domain includes a root complex and a PCIe device, where the PCIe device in the primary domain has a first bus set; and the extended domain includes a root complex endpoint device and a PCIe device, where the PCIe device in the extended domain has a second bus set, the first bus set is different from the second bus set, and the root complex endpoint device is the PCIe device in the primary domain and a root complex in the extended domain; the method may be executed by a CPU in the system, and the method includes:

S301: Allocate a configuration space address to the PCIe device in the extended domain from a memory address of the RCEP.

The RCEP is isolated from the PCIe device in the extended domain in a hardware manner, so that the CPU in the system cannot determine or identify the PCIe device in the extended domain. Therefore, an address may be allocated as a first memory address of the PCIe device in the extended domain from the memory address of the RCEP; when a target address carried in an access packet is in an address interval of the first memory address, it may be determined that the PCIe device in the extended domain is to be accessed, so that the PCIe device in the extended domain is mapped to the primary domain and the CPU can determine or identify the PCIe device in the extended domain.

The memory address of the RCEP includes a configuration space address of the RCEP and an MMIO address of the RCEP, and correspondingly, the first memory address of the PCIe device in the extended domain may include a first configuration space address (briefly referred to as a configuration space address of the PCIe device in the extended domain below) and a first MMIO address. When the target address is in an address interval of the configuration space address of the PCIe device in the extended domain, it indicates that configuration space access of the PCIe device in the extended domain is to be performed; when the target address is in an address interval of the first MMIO address of the PCIe device in the extended domain, it indicates that MMIO access of the PCIe device in the extended domain is to be performed.

In an address allocation process, the configuration space address may be allocated from the MMIO address of the RCEP to the PCIe device in the extended domain, so that the CPU may identify the PCIe device in the extended domain subsequently, and perform configuration space access of the PCIe device in the extended domain, so as to discover the PCIe device in the extended domain.

Figure 4:
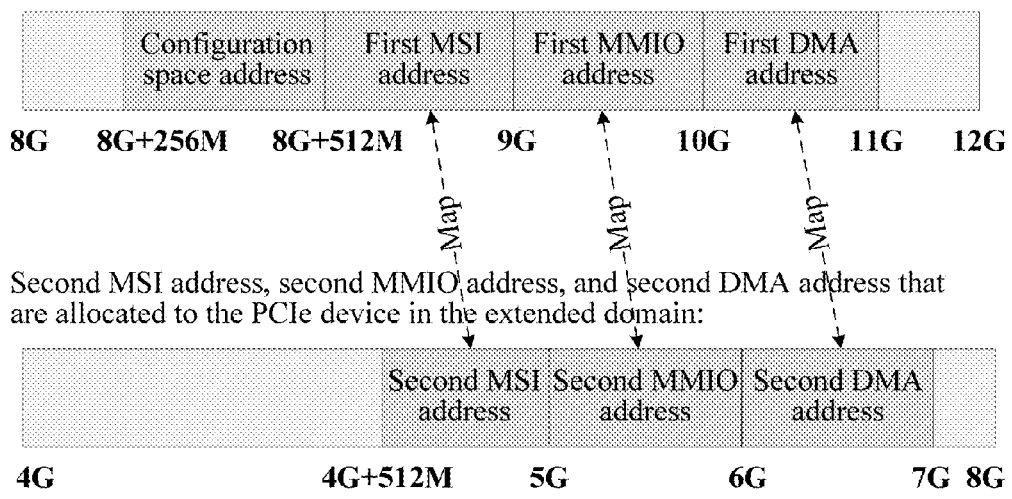
FIG. 4 is an allocation diagram of a memory address according to an embodiment of the present invention.

According to PCIe specifications, each PCIe domain has 256 buses at most; each bus has 32 device numbers at most; each device number includes 8 function numbers at most; each function number is associated with one PCIe device at most; a size of configuration space of each PCIe device is 4 kilobytes (K); therefore a maximum value of a size of a configuration space address occupied by the PCIe device in the extended domain is 256*32*8*4=256 Megabytes (M). Therefore, in a case in which the number of PCIe devices in the extended domain cannot be determined, a configuration space address having a size of 256 M may be allocated to the PCIe device in the extended domain. For example, as shown in FIG. 4, the MMIO address of the RCEP is [8 Gigabytes (G), 12 G], and the configuration space address allocated to the PCIe device in the extended domain may be [8 G+256 M, 8 G+512 M].

The foregoing method is an optional implementation manner. Certainly, in another embodiment, a configuration space address may be allocated to the PCIe device in the extended domain from another memory address of the RCEP, and the size of the configuration space address of the PCIe device in the extended domain is possibly not 256 M, which is not limited in this embodiment of the present invention.

S302: Establish a correspondence between the configuration space address and a BDF.

The PCIe device in the extended domain corresponds to one BDF, and a configuration space register of the PCIe device in the extended domain may be accessed by using the BDF of the PCIe device in the extended domain, that is, configuration space access of the PCIe device in the extended domain is performed. Therefore, the correspondence between the configuration space address and the BDF is established, that is, a correspondence between the configuration space address and the configuration space register of the PCIe device in the extended domain is established, so that subsequently the configuration space register of the PCIe device in the extended domain may be accessed according to the correspondence between the configuration space address and the BDF and by using the configuration space address, so as to discover the PCIe device in the extended domain.

Establishing the correspondence between the configuration space address and the BDF may refer to establishing a correspondence between each memory address of 4K in the configuration space address and each BDF in the extended domain. Specifically, when the configuration space address of the PCIe device in the extended domain is [start address, start address+256 M], [start address, start address+4K] may correspond to BDF=00:00.0 in the extended domain, and [start address+4K, start address+8K] may correspond to BDF=00:00.1, and by analogy, [start address+256 M−4K, start address+256 M] corresponds to BDF=FF:1F:7. For example, as shown in FIG. 4, the configuration space address of the PCIe device in the extended domain is [8 G+256 M, 8 G+512 M], and a correspondence between the configuration space address and the BDF is established, so that the configuration space address [8 G+256 M, 8 G+256 M+4K] corresponds to BDF=00:00.0, which indicates that a configuration space address of the PCIe device associated with the $0^{th}$ function of the $0^{th}$ device on the $0^{th}$ bus is [8 G+256 M, 8 G+256 M+4K]; [8 G+256 M+4K, 8 G+256 M+8K] corresponds to BDF=00:00.1; [8 G+256 M+8K, 8 G+256 M+12K] corresponds to BDF=00:00.2; [8 G+256 M+12K, 8 G+256 M+16K] corresponds to BDF=00:00.3; and by analogy, [8 G+512 M−4K, 8 G+512 M] corresponds to BDF=FF:1F.7.

In this embodiment of the present invention, the foregoing correspondence between the configuration space address and the BDF is only an example, and certainly, another correspondence between the configuration space address and the BDF may also be established, which is not limited in this embodiment of the present invention.

S303: Save the correspondence between the configuration space address and the BDF on the RCEP, so that the RCEP can perform address translation according to the correspondence between the configuration space address and the BDF, to implement configuration space access of the PCIe device in the extended domain.

When the CPU performs configuration space access of the PCIe device in the extended domain, an access packet is first routed to the primary domain, and can be sent to the PCIe device in the extended domain only after the RCEP performs address translation on an access target address of the access packet; therefore, the correspondence between the configuration space address and the BDF may be saved on the RCEP, for example, saved in a register of the RCEP, so that the RCEP may perform address translation according to the correspondence subsequently, thereby implementing configuration space access of the PCIe device in the extended domain.

Specifically, when the CPU in the system performs configuration space access of the PCIe device in the extended domain according to an instruction of the PCIe device in the primary domain or of an operating system, the CPU sends the access packet, where the access target address of the access packet is the configuration space address of the PCIe device in the extended domain. The configuration space address of the PCIe device in the extended domain belongs to the memory address of the RCEP; therefore, the access packet is sent to the RCEP, and after receiving the access packet, the RCEP performs address translation by using the saved correspondence between the configuration space address and the BDF, to obtain by means of translation the BDF of the PCIe device in the extended domain, that is, a translated access target address, so that the RCEP may send the access packet to the configuration space register of the PCIe device in the extended domain by using the BDF of the PCIe device in the extended domain, thereby implementing configuration space access of the PCIe device in the extended domain.

S304: Discover the PCIe device in the extended domain by using the configuration space address, and allocate a bus number to the PCIe device discovered in the extended domain.

The RCEP is isolated from the PCIe device in the extended domain in a hardware manner; therefore the PCIe device in the extended domain is invisible to the system, and only the PCIe device in the primary domain can be discovered when the system is started. Therefore, the CPU in the system may access the configuration space register of the PCIe device in the extended domain according to the correspondence between the configuration space address and the BDF and by using the configuration space address, to discover the PCIe device in the extended domain, and allocate a bus number or an MMIO memory address to the PCIe device discovered in the extended domain.

The CPU in the system has not allocated a bus number to the PCIe device in the extended domain yet, and cannot determine a BDF of each PCIe device in the extended domain, but may determine all BDFs that may exist in the extended domain; therefore, the CPU may access, by using the configuration space address, configuration space registers of PCIe devices corresponding to all the BDFs that may exist in the extended domain, so as to determine whether the PCIe devices corresponding to all the BDFs that may exist in the extended domain exist in a hardware form, that is, discover the PCIe device in the extended domain. When a PCIe device corresponding to a certain BDF exists in a hardware form, a bus number is allocated to the PCIe device, so as to determine the BDF of the PCIe device, so that a configuration space register of the PCIe device may be accessed by using the BDF of the PCIe device.

Specifically, the CPU in the system may send, by using the configuration space address, a device query message to the configuration space register of the PCIe device that corresponds to the BDF corresponding to the configuration space address, so as to discover the PCIe device in the extended domain, that is, determine the PCIe device that exists in the extended domain in a hardware from. When a bus number is allocated to the PCIe device in the extended domain, a type of the PCIe device in the extended domain may be determined first, for example, whether the PCIe device is a bridge device or a PCIe endpoint device. If the PCIe device is a bridge device, a bus number may be allocated to the bridge device in the extended domain from bus numbers that are not allocated in the second bus set; if the PCIe device is an endpoint device, a bus number allocated to the endpoint device in the extended domain may be the same as a bus number of a bridge device connected to the endpoint device. The discovering the PCIe device in the extended domain and allocating the bus number to the PCIe device in the extended domain may be implemented by means of bus enumeration, so that, after a bus number is allocated to the PCIe device discovered in the extended domain, a BDF of the PCIe device discovered in the extended domain may be determined, that is, a configuration space address of the PCIe device discovered in the extended domain is determined. Subsequently, the CPU may perform, by using the configuration space address of the PCIe device discovered in the extended domain, configuration space access of the PCIe device discovered in the extended domain.

Preferably, the PCIe device in the extended domain may be enumerated by using the following steps, so as to discover the PCIe device in the extended domain, and allocate a bus number from the second bus set to the PCIe device discovered in the extended domain.

a) Initialize an enumerated bus number, an enumerated device number, an enumerated function number, and an allocated bus number. For example, during initialization, it is set that the enumerated bus number=00, the enumerated device number=00, and the enumerated function number=0, that is, BDF=00:00.0, which indicates that a PCIe device in the extended domain is discovered starting from the time when the bus number is 00, the device number is 00, and the function number is 0, and a bus number allocated to a PCIe device first discovered in the extended domain is: the allocated bus number=00.

b) Acquire, according to the correspondence between the configuration space address and the BDF, the configuration space address corresponding to the BDF, and send a device query message by using the configuration space address corresponding to the BDF, so that the RCEP sends, according to the correspondence between the configuration space address and the BDF, the device query message to a configuration space register of a PCIe device corresponding to the BDF, and determines, according to a returned device query response message, whether the PCIe device corresponding to the BDF exists; and if the PCIe device does not exist, perform step c) to continue enumeration; or if the PCIe device exists, perform step d) to allocate a bus number. For example, the device query message is sent to a VendorId register and a DeviceId register of the PCIe device corresponding to BDF=00:00.0; if the returned message is all Fs (denoted by a hexadecimal notation), it indicates that the device does not exist, and step c) is performed to continue enumeration; otherwise, it indicates that the device exists, and step d) is performed to allocate a bus number 00 to the discovered PCIe device, and it is determined that the device number of the discovered PCIe device on the bus 00 is 00, and the function number is 0.

c) If the device does not exist, change the enumerated bus number, the enumerated device number or the enumerated function number, thereby updating the BDF, and return to perform step b), so as to determine whether a PCIe device in the extended domain exists on another bus number, device number or function number. For example, it is set that the enumerated bus number=00, the enumerated device number=00, and the enumerated function number=1, that is, the updated BDF=00:00.1, and step b) is performed, so as to determine whether a corresponding PCIe device on the function number 1 of the device number 00 of the bus number 00 exists.

d) If the device exists, which indicates that a PCIe device in the extended domain is discovered, further determine whether a device type of the PCIe device discovered in the extended domain is a PCIe endpoint device or a bridge device. If the PCIe device discovered in the extended domain is an endpoint device, use a bus number of a bridge device mounted to the PCIe device discovered in the extended domain as a bus number of the endpoint device, keep the allocated bus number unchanged, and change the enumerated bus number, the enumerated device number or the enumerated function number, thereby updating the BDF, and return to perform step b), so as to continue enumeration to discover a PCIe device in the extended domain; if the PCIe device discovered in the extended domain is a bridge device, allocate a bus number to the bridge device in the extended domain from bus numbers that are not allocated in the second bus set, update the allocated bus number, keep the enumerated bus number unchanged, and update the enumerated device number and the enumerated function number, thereby updating the BDF, and return to perform step b), so as to determine whether a PCIe device is mounted to the bridge, and allocate a second bus to the device mounted to the bridge.

Further, if the PCIe device in the extended domain supports a single-root virtualization function, a bus number may be reserved for the endpoint device from bus numbers that are not allocated in the second bus set, so that subsequently the PCIe device in the extended domain may perform corresponding processing by using the reserved bus number.

Further, the configuration space register of the PCIe device in the extended domain may be further queried, to obtain attribute information of the PCIe device in the extended domain, which includes a size of a base address register of the PCIe device in the extended domain, an attribute of the base address register, whether the device is prefetchable (Prefetchable), and the like, so that a virtual primary domain address may be allocated to the PCIe device in the extended domain according to the attribute information of the PCIe device in the extended domain subsequently. For example, the configuration space address of the PCIe device in the extended domain may be determined according to the BDF of the PCIe device in the extended domain, and a write configuration space access message is sent to a configuration space register of the endpoint device by using the configuration space address, so as to write FFFFFFFF into the configuration space register of the endpoint device, and the attribute information of the endpoint device may be determined according to the read message.

S305: Allocate, from the memory address of the RCEP, a first MMIO address to the PCIe device discovered in the extended domain.

After the PCIe device in the extended domain is discovered, the first MMIO address may be allocated, from MMIO addresses except the allocated MMIO address of the RCEP, to the PCIe device discovered in the extended domain, so as to map the PCIe device in the extended domain to the primary domain, so that subsequently the CPU in the system may perform, by using the first MMIO address, MMIO access of the PCIe device discovered in the extended domain, where a size of a first MMIO address allocated to each PCIe device may be a size of a base address register (Base Address Register) of each PCIe device.

Specifically, configuration space access of the PCIe device discovered in the extended domain may be performed, so as to acquire the size of the base address register of each PCIe device, and then an address is allocated as the first MMIO address of each PCIe device according to the size of the base address register of each PCIe device from MMIO addresses of the RCEP that are not allocated. There may be multiple PCIe devices in the extended domain; therefore, when the first MMIO address is allocated to the PCIe device discovered in the extended domain, the first MMIO address may be allocated to the PCIe device in the extended domain when one PCIe device in the extended domain is discovered in step S304, for example, when it is determined in step 304 that a target device corresponding to BDF=07:01.0 exists, that is, the PCIe device in the extended domain exists, the first MMIO address is allocated to the device; when it is determined that a target device corresponding to BDF=07:03.0 exists, the first MMIO address is allocated to the device; or the first MMIO address may be allocated to the PCIe device in the extended domain after all PCIe devices in the extended domain are discovered, which is not limited in this embodiment of the present invention.

Further, a start address of the first MMIO address of the PCIe device discovered in the extended domain may be further saved in the base address register of each PCIe device, so that the first MMIO address of the PCIe device discovered in the extended domain may be acquired subsequently by accessing the base address register of the PCIe device discovered in the extended domain.

S306: Establish a mapping between the first MMIO address and a second MMIO address of the PCIe device discovered in the extended domain, to allocate the second MMIO address to the PCIe device discovered in the extended domain.

Before the second MMIO address is allocated to the PCIe device discovered in the extended domain, the mapping between the first MMIO address and the second MMIO address of the PCIe device discovered in the extended domain may be established first, so as to map the second MMIO address of the PCIe device discovered in the extended domain to the primary domain, and then the second MMIO address of the PCIe device discovered in the extended domain is determined according to the mapping between the first MMIO address and the second MMIO address, so that the CPU may implement, according to the mapping between the first MMIO address and the second MMIO address and by using the first MMIO address, MMIO access of the PCIe device discovered in the extended domain, where the second MMIO address is different from the first MMIO address, belongs to a memory address resource in the extended domain, and is different from a memory address of the PCIe device in the primary domain.

For example, as shown in FIG. 4, the first MMIO address of the PCIe device discovered in the extended domain may be [9 G, 10 G], where [9 G, 9 G+4 M] is a first MMIO address of a PCIe device 112A in the extended domain, [9 G+1000 M, 10 G] is a first MMIO address of a PCIe device 116 in the extended domain, and the mapping between the first MMIO address and the second MMIO address of the PCIe device in the extended domain is set to an address offset of 4 G, so that a second configuration space address allocated to the PCIe device discovered in the extended domain may be [5 G, 6 G], where [5 G, 5 G+4 M] is a second MMIO address of the PCIe device 112A in the extended domain, and [5 G+1000 M, 6 G] is a second MMIO address of the PCIe device 116 in the extended domain.

S307: Save the mapping between the first MMIO address and the second MMIO address on the RCEP, so that the RCEP can perform address translation according to the mapping, thereby implementing MMIO access of the PCIe device in the extended domain.

When the CPU in the system performs MMIO access of the PCIe device in the extended domain, an access packet is first routed to the primary domain, and can be sent to the PCIe device in the extended domain only after the RCEP performs address translation on an access target address of the access packet; therefore, the established mapping between the first MMIO address and the second MMIO address may be saved on the RCEP, for example, saved in a register of the RCEP, so that the RCEP may perform address translation according to the mapping subsequently, thereby implementing MMIO access of the PCIe device in the extended domain.

Specifically, when the CPU in the system performs MMIO access of the PCIe device in the extended domain according to an instruction of the PCIe device in the primary domain or an instruction of an operating system, the CPU sends an access packet to the RCEP, where an access target address of the access packet is the first MMIO address of the PCIe device in the extended domain; after the RCEP receives the access packet, the RCEP performs address translation on the target address by using the saved mapping between the first MMIO address and the second MMIO address, to obtain by means of translation the second MMIO address of the PCIe device in the extended domain, that is, a translated access target address, so that the RCEP may send the access packet to the PCIe device in the extended domain according to the translated access target address, thereby implementing MMIO access of the PCIe device in the extended domain.

S308: Establish and save a correspondence between an identifier of the PCIe device in the extended domain and the first MMIO address of the PCIe device, so as to obtain the first MMIO address of the PCIe device in the extended domain by using the identifier of the PCIe device in the extended domain, to perform MMIO access.

After allocating the first MMIO address to the PCIe device in the extended domain, the CPU in the system may further establish the correspondence between the first MMIO address of the PCIe device in the extended domain and the identifier of the PCIe device in the extended domain, so that subsequently the CPU in the system may obtain the first MMIO address of the PCIe device in the extended domain according to the identifier of the PCIe device in the extended domain, to perform MMIO access of the PCIe device in the extended domain.

The identifier of the PCIe device in the extended domain may be the BDF of the PCIe device in the extended domain, or a device ID or a vendor ID of the PCIe device in the extended domain, which is not limited in this embodiment of the present invention.

S309: Establish and save an MMIO resource tree of the extended domain according to the first MMIO address of the PCIe device in the extended domain.

Figure 5:
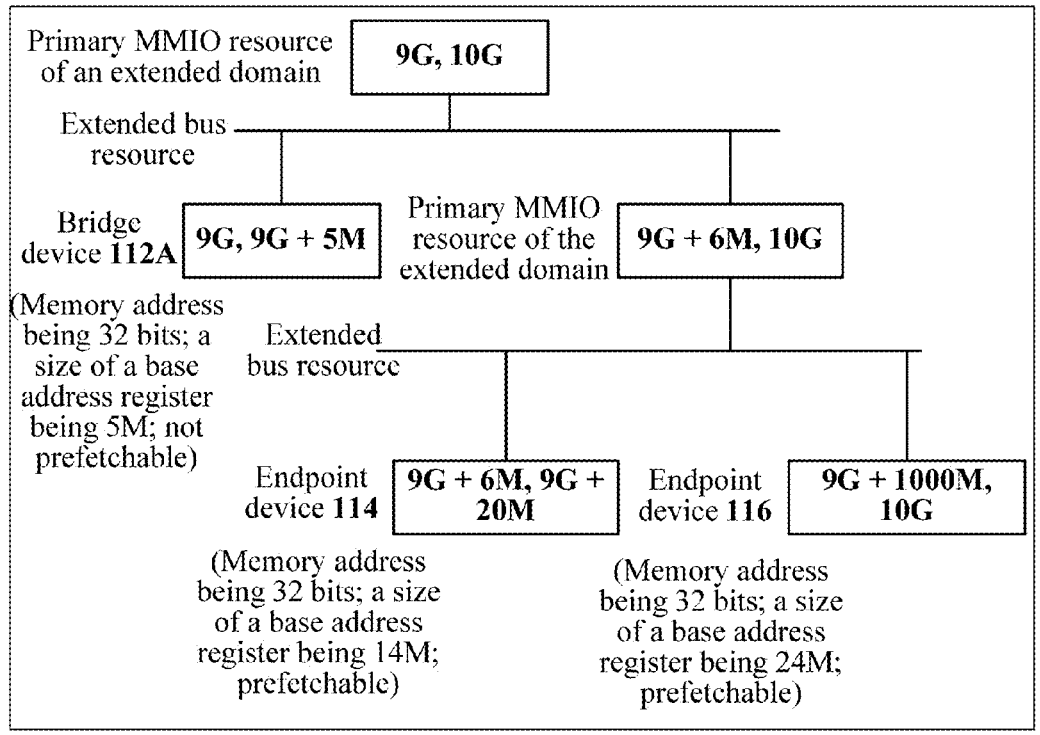
FIG. 5 shows a memory-mapped I/O resource tree of an extended domain according to an embodiment of the present invention.

The CPU in the system may further establish the MMIO resource tree of the extended domain according to the first MMIO address of the PCIe device in the extended domain, and save the MMIO resource tree of the extended domain, so that subsequently a first MMIO address resource of the extended domain may be managed by using the MMIO resource tree of the extended domain, for example, the established MMIO resource tree of the PCIe device in the extended domain may be shown in FIG. 5. It may be determined according to the figure that a first MMIO address allocated to the bridge device 112A is [9 G, 9 G+4 M], and a first MMIO address allocated to an endpoint device 114 is [9 G+6 M, 9 G+20 M]. Further, the MMIO resource tree of the extended domain may further include attribute information of the PCIe device in the extended domain, for example, whether a length of a memory address of the PCIe device in the extended domain is 32 bits or 64 bits, whether the PCIe device in the extended domain is prefetchable, and the size of the base address register of the PCIe device in the extended domain.

S310: Allocate a first MSI address to the PCIe device in the extended domain from the memory address of the RCEP, and allocate a second MSI address to the PCIe device in the extended domain according to the first MSI address, so as to implement MSI access of the PCIe device in the extended domain according to a mapping between the first MSI address and the second MSI address.

Further, the CPU in the system may further allocate the first MSI address and the second MSI address to the PCIe device in the extended domain, and save the mapping between the first MSI address and the second MSI address of the PCIe device in the extended domain on the RCEP, so that the PCIe device in the extended domain can perform MSI access, that is, an interrupt is generated.

Specifically, an address may be allocated as the first MSI address of the PCIe device in the extended domain from MMIO addresses of the RCEP that are not allocated, the mapping between the first MSI address and the second MSI address of the PCIe device in the extended domain may be established, and then the second MSI address of the PCIe device in the extended domain may be obtained according to the established mapping. For example, as shown in FIG. 4, the first MSI address and the second MSI address allocated to the PCIe device in the extended domain may be [8 G+513 M, 9 G−1 M] and [4 G+513 M, 5 G−1 M] respectively, and the mapping between the first MSI address and the second MSI address of the PCIe device in the extended domain is an address offset of 4 G.

When the PCIe device in the extended domain needs to request message signaled interrupts from the system, the PCIe device first applies for the second MSI address from the RCEP, and sends an access packet to the RCEP according to the second MSI address, where an access target address of the access packet belongs to an address interval of the second MSI address. The RCEP performs address translation according to the mapping between the first MSI address and the second MSI address of the PCIe device in the extended domain, to obtain a translated access target address that belongs to the first MSI address. The RCEP determines that MSI access of the PCIe device in the extended domain needs to be performed, and requests message signaled interrupts from the CPU in the system. The message signaled interrupts may be routed to the root complex in the primary domain according to the translated access target address, and then be sent to the CPU, so as to complete MSI access of the PCIe device in the extended domain.

This step may be performed before step S301 or after step S301, which is not limited in this embodiment of the present invention.

S311: Allocate a first DMA address to the PCIe device in the extended domain from the memory address of the RCEP, and allocate a second DMA address to the PCIe device in the extended domain according to the first DMA address, so as to implement DMA access of the PCIe device in the extended domain according to a mapping between the first DMA address and the second DMA address.

Further, the CPU in the system may further allocate the first DMA address and the second DMA address to the PCIe device in the extended domain, and save the mapping between the first DMA address and the second DMA address of the PCIe device in the extended domain on the RCEP, so that the PCIe device in the extended domain can perform DMA access, where the DMA access is actively initiated by the PCIe device, and mutual communication between PCIe devices may be implemented by means of DMA access.

Specifically, the CPU in the system may allocate an address as a first DMA address of the PCIe device in the extended domain from MMIO addresses of the RCEP that are not allocated, establish the mapping between the first DMA address and the second DMA address of the PCIe device in the extended domain, and then obtain the second DMA address of the PCIe device in the extended domain according to the established mapping. For example, as shown in FIG. 4, the first DMA address and the second DMA address allocated to the PCIe device in the extended domain may be [10 G, 11 G] and [6 G, 7 G] respectively, and the mapping between the first DMA address and the second DMA address of the PCIe device in the extended domain may be an address offset of 4 G.

When the PCIe device in the extended domain needs to perform DMA access, the PCIe device applies for the second DMA address from the RCEP, and sends an access packet to the RCEP according to the second DMA address that is applied for, where an access target address of the access packet belongs to an address interval of the second DMA address. The RCEP performs address translation according to the mapping between the first DMA address and the second DMA address of the PCIe device in the extended domain, and the obtained translated access target address belongs to the first DMA address. The RCEP determines that DMA access of the PCIe device in the extended domain needs to be performed, allocates the first DMA address to the PCIe device in the extended domain from the first DMA address, and sends the access packet to the allocated first DMA address, thereby implementing DMA access of the PCIe device in the extended domain.

This step may be performed before step S301 or after step S301, which is not limited in this embodiment of the present invention.

S312: Initialize the PCIe device discovered in the extended domain.

The RCEP 106 is isolated from PCIe device in the extended domain in a hardware manner; therefore the PCIe device in the extended domain is invisible to the system, and a basic I/O system or an operating system of the system cannot initialize the PCIe device in the extended domain when the system is started. Therefore, the CPU in the system may initialize, according to an instruction of the basic I/O system or an instruction of the operating system, the PCIe device discovered in the extended domain after the PCIe device in the extended domain is discovered, so that the PCIe device in the extended domain is ready and may be normally used.

Specifically, after the PCIe device in the extended domain is determined, configuration space access of the PCIe device in the extended domain may be performed, to acquire configuration information of the PCIe device in the extended domain, and corresponding configuration is performed on the configuration space register of the PCIe device in the extended domain according to the configuration information, for example, configuration space registers corresponding to functions such as interrupts, power management, vital product data (VPD), and virtualized I/O of the PCIe device in the extended domain are configured, so that the PCIe device in the extended domain can work normally.

S313: Load a driver of the PCIe device discovered in the extended domain.

The CPU in the system may further search a pre-configured device driver for a device driver of the PCIe device in the extended domain, and load the device driver. Specifically, the CPU may acquire a device identifier corresponding to the pre-configured device driver, such as a device identifier (ID) or a vendor ID, and try to match the device identifier with a device identifier recorded in the configuration space register of the PCIe device in the extended domain; if the matching succeeds, it is determined that the device driver is the device driver of the PCIe device in the extended domain, and the device driver is loaded. For example, a vendor ID of a device driver A is used to be matched with vendor IDs recorded in configuration space registers of PCIe devices in the extended domain (that is, configuration space access of the PCIe devices in the extended domain is performed by using the first configuration space address of the extended domain) one by one. When the vendor ID is consistent with a vendor ID recorded in a PCIe device A in the extended domain, a probe function of the device driver A is invoked; if the function does not return any error, it is determined that the device driver A is the device driver of the PCIe device A in the extended domain, and the foregoing process is repeated until device drivers of all the PCIe devices in the extended domain are determined.

In this embodiment of the present invention, the configuration space address is allocated to the PCIe device in the extended domain from the memory address of the RCEP, the correspondence between the configuration space address and the BDF is established, and the bus number is allocated from the second bus set of the extended domain to the PCIe device discovered in the extended domain, where the bus number is used for determining the BDF of the PCIe device discovered in the extended domain, so as to access, according to the correspondence between the configuration space address and the BDF and by using the BDF of the PCIe device discovered in the extended domain, the configuration space register of the PCIe device discovered in the extended domain, which implements configuration space access of the PCIe device discovered in the extended domain, completes extension of a PCIe domain, implements communication between the CPU or the primary domain and the extended domain, and solves a problem in the prior art that a PCIe domain cannot be extended, so that the number of PCIe devices in the system is not restricted by 256 buses.

Further, the first MMIO address and the second MMIO address may be further allocated to the PCIe device discovered in the extended domain, so as to implement, according to the mapping between the first MMIO address and the second MMIO address, MMIO access of the PCIe device discovered in the extended domain. Further, the first MSI address and the second MSI address may be further allocated to the PCIe device in the extended domain, so as to implement, according to the mapping between the first MSI address and the second MSI address, MSI access of the PCIe device in the extended domain. In addition, the first DMA address and the second DMA address may be further allocated to the PCIe device in the extended domain, so as to implement, according to the mapping between the first DMA address and the second DMA address, DMA access of the PCIe device in the extended domain.

Method for Accessing a PCIe Domain

Figure 6:
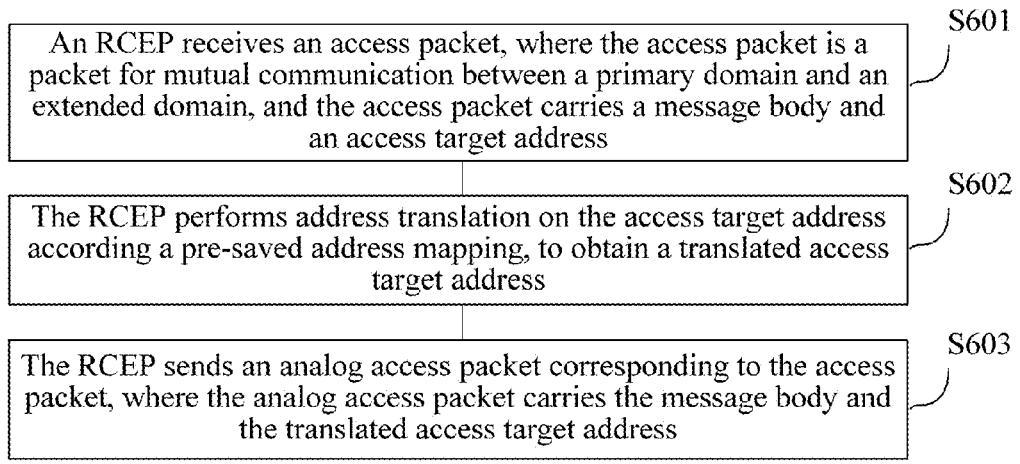
FIG. 6 is a flowchart of still another method according to an embodiment of the present invention.

With reference to the system architecture shown in FIG. 1, an embodiment of the present invention provides a method for accessing a PCIe domain. As shown in FIG. 6, the method is used for a system including a primary domain and an extended domain, where the primary domain includes a root complex and a PCIe device, where the PCIe device in the primary domain has a first bus set; and the extended domain includes a root complex endpoint device and a PCIe device, where the PCIe device in the extended domain has a second bus set, the first bus set is different from the second bus set, and the root complex endpoint device is the PCIe device in the primary domain and a root complex in the extended domain; the method includes:

S601: The RCEP receives an access packet, where the access packet is a packet for mutual communication between the primary domain and the extended domain, and the access packet carries a message body and an access target address.

The RCEP isolates the primary domain from the extended domain in a hardware manner; therefore, access packets of both the primary domain and the extended domain need to be forwarded by the RCEP, and the RCEP may receive an access packet, where the access packet is an access packet for mutual communication between the primary domain and the extended domain. For example, when a CPU in the system accesses the PCIe device in the extended domain, an access packet is first routed to the root complex in the primary domain, and the root complex in the primary domain sends the access packet to the RCEP according to an access target address of the access packet; for another example, when the PCIe device in the extended domain accesses the primary domain or the CPU, the PCIe device in the extended domain sends an access packet to the RCEP, where the access packet carries a message body and an access target address.

S602: The RCEP performs address translation on the access target address according a pre-saved address mapping, to obtain a translated access target address.

The CPU in the system can see only the PCIe device in the primary domain, that is, can use a memory address only of the PCIe device in the primary domain, such as a memory address of the RCEP, and the PCIe device in the extended domain can see only another PCIe device in the extended domain and the RCEP, that is, can use a memory address only of the PCIe device in the extended domain, such as a second MMIO address or a second MSI address; therefore, the RCEP may pre-save an address mapping between the memory address or a BDF of the PCIe device in the extended domain and the memory address of the RCEP, and translate the access target address into the memory address or the BDF of the PCIe device in the extended domain according to the address mapping, so as to implement access of the PCIe device in the extended domain, or translate the access target address into the memory address of the RCEP, so as to implement access of the primary domain or the CPU by using the RCEP.

S603: The RCEP sends an analog access packet corresponding to the access packet, where the analog access packet carries the message body and the translated access target address.

The message body is read and write access data or another operation instruction of the access packet. The RCEP may generate, according to the message body and the translated access target address, the analog access packet corresponding to the access packet, where the analog access packet carries the translated access target address and the message body. The RCEP may send the analog access packet, to implement mutual access between the CPU or the primary domain and the extended domain.

In this embodiment of the present invention, the RCEP may receive the access packet, where the access packet is a packet for mutual communication between the primary domain and the extended domain; perform address translation on the access target address of the access packet according to the pre-saved address mapping, for example, translate the memory address of the primary domain into the memory address of the extended domain, to obtain the translated access target address; and send the analog access packet corresponding to the access packet, where the analog access packet carries the translated access target address, so that the primary domain or the CPU can access the PCIe device in the extended domain, or the PCIe device in the extended domain can access the primary domain or the CPU, so as to implement communication between the CPU in the system or the primary domain and the extended domain, complete extension of a PCIe domain in the system, implement communication of an extended PCIe domain, and solve a problem in the prior art that a PCIe domain cannot be extended, so that the number of PCIe devices in the system is not restricted by 256 buses.

Further, the access packet may be a packet for performing configuration space access of the PCIe device in the extended domain by the CPU in the system, so that the CPU in the system acquires a configuration space address of the PCIe device in the extended domain as the access target address of the access packet, where the configuration space address belongs to the memory address of the RCEP, and then the access packet is sent to the RCEP. The RCEP performs address translation according to a correspondence between the configuration space address and a BDF of the PCIe device in the extended domain, to obtain the BDF of the PCIe device in the extended domain, that is, the translated access target address. The RCEP may generate the analog access packet according to the translated access target address and the message body of the access packet and send the analog access packet to a configuration space register of the PCIe device in the extended domain by using the translated access target address, to implement configuration space access of the PCIe device in the extended domain.

Further, the access packet may be an access packet for performing MMIO access of the PCIe device in the extended domain by the CPU in the system, so that the CPU in the system acquires a first MMIO address of the PCIe device in the extended domain as the access target address of the access packet, where the first MMIO address belongs to the memory address of the RCEP, and then the access packet is sent to the RCEP. The RCEP performs address translation according to a mapping between the first MMIO address and a second MMIO address of the PCIe device in the extended domain, to obtain the second MMIO address of the PCIe device in the extended domain, that is, the translated access target address. The RCEP generates the analog access packet according to the translated access target address and the message body of the access packet and send the analog access packet to the PCIe device in the extended domain by using the translated access target address, to implement MMIO access of the PCIe device in the extended domain.

Further, the access packet may be a packet for applying for message signaled interrupts from the CPU in the system by the PCIe device in the extended domain, so that the PCIe device in the extended domain may apply for a second MSI address from the RCEP, use the second MSI address, which is obtained by means of application, as the access target address of the access packet, and send the access packet to the RCEP. The RCEP performs address translation according to a mapping between a first MSI address and the second MSI address of the PCIe device in the extended domain, to obtain the first MSI address of the PCIe device in the extended domain, that is, the translated access target address, where the first MSI address belongs to the memory address of the RCEP. The RCEP generates the analog access packet according to the translated access target address and the message body of the access packet, and the access packet of an MSI type is routed to the root complex in the primary domain by using the translated access target address, and then is sent to the CPU in the system, to implement MSI access of the PCIe device in the extended domain.

Further, the access packet may be a packet for performing direct memory access of the system by the PCIe device in the extended domain. For example, when the PCIe device in the extended domain communicates with the PCIe device in the primary domain, the direct memory access may be used, so that the PCIe device in the extended domain may apply for a second DMA address from the RCEP, use the second DMA address, which is obtained by means of application, as the access target address of the access packet, and send the access packet to the RCEP. The RCEP performs address translation according to a mapping between a first DMA address and the second DMA address of the PCIe device in the extended domain, to obtain the first DMA address of the PCIe device in the extended domain, that is, the translated access target address, where the first DMA address belongs to the memory address of the RCEP. The RCEP generates the analog access packet according to the translated access target address and the message body of the access packet and apply for a DMA address of the primary domain from the root complex in the primary domain by using the translated access target address to perform DMA access, so as to implement DMA access of the PCIe device in the extended domain.

Apparatus Embodiments of the Present Invention

Figure 7:
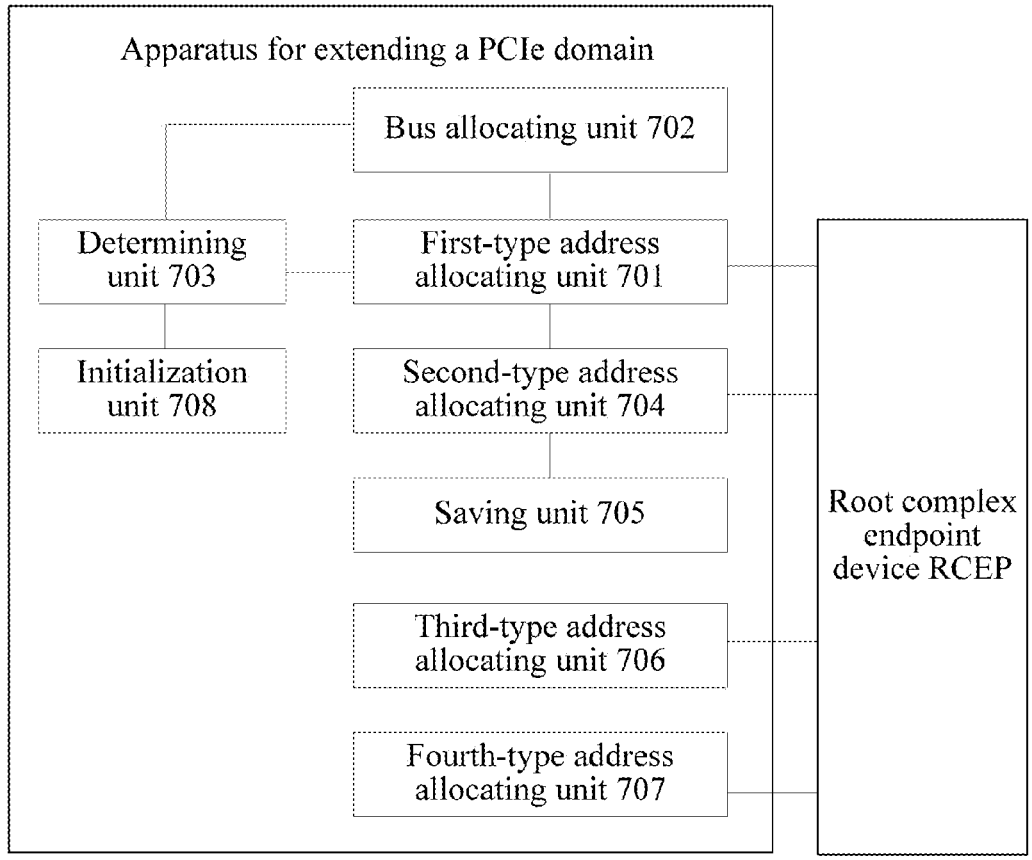
FIG. 7 is a composition diagram of an apparatus according to an embodiment of the present invention.

With reference to the system architecture shown in FIG. 1, an embodiment of the present invention provides an apparatus for accessing a PCIe domain. As shown in FIG. 7, the apparatus is used for a system including a primary domain and an extended domain, where the primary domain includes a root complex and a PCIe device, where the PCIe device in the primary domain has a first bus set; the extended domain includes the apparatus and a PCIe device, where the PCIe device in the extended domain has a second bus set, the first bus set is different from the second bus set, and the apparatus is the PCIe device in the primary domain and a root complex in the extended domain. The apparatus may be the root complex endpoint device 106 in the system shown in FIG. 1, and the apparatus may include a first-type address allocating unit 701 and a bus allocating unit 702.

The first-type address allocating unit 701 is configured to allocate a configuration space address to the PCIe device in the extended domain from a memory address of the RCEP, and establish a correspondence between the configuration space address and a BDF, for example, allocate an address as the configuration space address of the PCIe device in the extended domain from an MMIO address of the RCEP, so as to map the PCIe device in the extended domain to the primary domain; when configuration space access is performed, the configuration space address can represent, in the primary domain, the PCIe device in the extended domain, so that a CPU in the system or the PCIe device in the primary domain may identify the PCIe device in the extended domain, which helps subsequently perform configuration space access of the PCIe device in the extended domain. Further, the first-type address allocating unit 701 may further save the correspondence between the configuration space address and the BDF on the root complex endpoint device, so that the root complex endpoint device can perform address translation according to the correspondence between the configuration space address and the BDF, to implement configuration space access of a PCIe device discovered in the extended domain.

The bus allocating unit 702 is configured to allocate, from the second bus set, a bus number to the PCIe device discovered in the extended domain, where the bus number is used for determining a BDF of the PCIe device discovered in the extended domain, so as to implement, according to the correspondence between the configuration space address and the BDF and by using the BDF of the PCIe device discovered in the extended domain, configuration space access of the PCIe device discovered in the extended domain.

Further, the apparatus may further include a determining unit 703 configured to discover the PCIe device in the extended domain by using the configuration space address of the PCIe device in the extended domain and the correspondence between the configuration space address and the BDF, where the CPU in the system does not allocate a bus number to the PCIe device in the extended domain, and a BDF of each PCIe device in the extended domain cannot be determined, but all BDFs that may exist in the extended domain may be determined; therefore the determining unit 703 may access configuration space registers of PCIe devices corresponding to all the BDFs that may exist in the extended domain by using the configuration space address, so as to determine whether the PCIe devices corresponding to all the BDFs that may exist in the extended domain exist in a hardware form, that is, discover the PCIe device in the extended domain, so that subsequently the bus allocating unit 702 may allocate, according to the PCIe device discovered in the extended domain by the determining unit 703, a bus number to the PCIe device discovered in the extended domain, and a second-type address allocating unit 704 configured to allocate a first MMIO address from the memory address of the RCEP to the PCIe device discovered in the extended domain, for example, allocate the first MMIO address from the MMIO address of the RCEP to the PCIe device discovered in the extended domain, and allocate, according to the first MMIO address, a second MMIO address to the PCIe device discovered in the extended domain, so as to implement, according to a mapping between the first MMIO address and the second MMIO address, MMIO access of the PCIe device discovered in the extended domain, where the second-type address allocating unit 704 may determine a size of a base address register of the PCIe device discovered in the extended domain, and allocate, according to the size of the base address register of the PCIe device discovered in the extended domain, the first MMIO address to the PCIe device discovered in the extended domain, then establish the mapping between the first MMIO address and the second MMIO address, and allocate, according to the mapping between the first MMIO address and the second MMIO address, the second MMIO address to the PCIe device discovered in the extended domain.

Further, the second-type address allocating unit 704 may further save the mapping between the first MMIO address and the second MMIO address on the RCEP, so that the RCEP can perform address translation according to the mapping between the first MMIO address and the second MMIO address, to implement MMIO access of the PCIe device discovered in the extended domain.

Further, the apparatus may further include a saving unit 705 configured to establish and save a correspondence between an identifier of the PCIe device discovered in the extended domain and the first MMIO address of the PCIe device discovered in the extended domain, and obtain, according to the identifier of the PCIe device discovered in the extended domain, the first MMIO address of the PCIe device discovered in the extended domain, to perform MMIO access.

The saving unit 705 may further establish and save an MMIO resource tree of the extended domain according to the first MMIO address of the PCIe device discovered in the extended domain after the second-type address allocating unit 704 allocates the first MMIO address to the PCIe device in the extended domain, so that a first MMIO address resource of the extended domain may be managed by using the MMIO resource tree of the extended domain subsequently, where the MMIO resource tree of the extended domain may further include attribute information of the PCIe device in the extended domain, for example, whether a length of a memory address of the PCIe device in the extended domain is 32 bits or 64 bits, whether the PCIe device in the extended domain is prefetchable, and a size of a base address register of the PCIe device in the extended domain.

Further, the apparatus may further include a third-type address allocating unit 706 configured to allocate a first message signaled interrupts address to the PCIe device in the extended domain from the memory address of the root complex endpoint device, and allocate a second message signaled interrupts address to the PCIe device in the extended domain according to the first message signaled interrupts address, so as to implement message signaled interrupts access of the PCIe device in the extended domain according to a mapping between the first message signaled interrupts address and the second message signaled interrupts address.

Further, the apparatus may further include a fourth-type address allocating unit 707 configured to allocate a first direct memory access address to the PCIe device in the extended domain from the memory address of the root complex endpoint device, and allocate a second direct memory access address to the PCIe device in the extended domain according to the first direct memory access address, so as to implement direct memory access of the PCIe device in the extended domain according to a mapping between the first direct memory access address and the second direct memory access address.

Further, the apparatus may further include an initialization unit 708 configured to initialize the PCIe device discovered in the extended domain, where specifically, after the determining unit 703 discovers the PCIe device in the extended domain, configuration space access of the PCIe device in the extended domain may be performed, to acquire configuration information of the PCIe device in the extended domain, and then corresponding configuration is performed on a configuration space register of the PCIe device in the extended domain according to the configuration information, for example, configuration space registers corresponding to functions such as interrupts, power management, VPD, and virtualized I/O of the PCIe device in the extended domain are configured, to complete initialization of the PCIe device discovered in the extended domain, thereby enabling the PCIe device discovered in the extended domain to be ready for normal operation.

In this embodiment of the present invention, the first-type address allocating unit 701 can allocate the configuration space address to the PCIe device in the extended domain from the memory address of the RCEP, and establish the correspondence between the configuration space address and the BDF, and the bus allocating unit 702 may allocate the bus number from the second bus set of the extended domain to the PCIe device discovered in the extended domain, where the bus number is used for determining the BDF of the PCIe device discovered in the extended domain, so as to access, according to the correspondence between the configuration space address and the BDF and by using the BDF of the PCIe device discovered in the extended domain, a configuration space register of the PCIe device discovered in the extended domain, which implements configuration space access of the PCIe device discovered in the extended domain, completes extension of a PCIe domain, implements communication between the CPU or the primary domain and the extended domain, and solves a problem in the prior art that a PCIe domain cannot be extended, so that the number of PCIe devices in the system is not restricted by 256 buses.

Further, the second-type address allocating unit 704 may further allocate the first MMIO address and the second MMIO address to the PCIe device discovered in the extended domain, so as to implement, according to the mapping between the first MMIO address and the second MMIO address, MMIO access of the PCIe device discovered in the extended domain. Further, the third-type address allocating unit may further allocate the first MSI address and the second MSI address to the PCIe device in the extended domain, so as to implement, according to the mapping between the first MSI address and the second MSI address, MSI access of the PCIe device in the extended domain. In addition, the fourth-type address allocating unit 707 may further allocate the first DMA address and the second DMA address to the PCIe device in the extended domain, so as to implement, according to the mapping between the first DMA address and the second DMA address, DMA access of the PCIe device in the extended domain.

Figure 8:
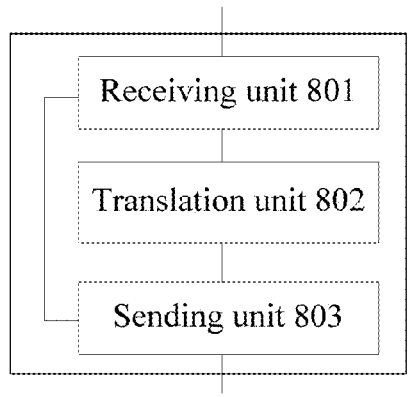
FIG. 8 is a composition diagram of another apparatus according to an embodiment of the present invention.

With reference to the system architecture shown in FIG. 1, an embodiment of the present invention provides an apparatus for accessing a PCIe domain. As shown in FIG. 8, the apparatus is used for a system including a primary domain and an extended domain, where the primary domain includes a root complex and a PCIe device, where the PCIe device in the primary domain has a first bus set; the extended domain includes the apparatus and a PCIe device, where the PCIe device in the extended domain has a second bus set, the first bus set is different from the second bus set, and the apparatus is the PCIe device in the primary domain and a root complex in the extended domain. The apparatus may be the root complex endpoint device 106 in the system shown in FIG. 1, and the apparatus may include a receiving unit 801, a translation unit 802, and a sending unit 803.

The receiving unit 801 is configured to receive an access packet, where the access packet is a packet for mutual communication between the primary domain and the extended domain, and the access packet carries a message body and an access target address.

The translation unit 802 is configured to perform address translation on the access target address according a pre-saved address mapping, to obtain a translated access target address. For example, the translation unit 802 may translate the access target address into an MMIO address or a BDF of the PCIe device in the extended domain, to implement access to the PCIe device in the extended domain, or translate the access target address into a memory address of the RCEP (for example, a first MSI address or a first DMA address of the device in the extended domain), to implement access to the primary domain or a CPU.

The sending unit 803 is configured to send an analog access packet corresponding to the access packet, where the analog access packet carries the message body and the translated access target address. The message body is read and write access data or another operation instruction of the access packet. The sending unit 803 may generate or acquire, according to the message body and the translated access target address, the analog access packet corresponding to the access packet, where the analog access packet carries the translated access target address and the message body. The sending unit 803 may send the analog access packet, to implement mutual access between the CPU or the primary domain and the extended domain.

The access target address may be a configuration space address of the PCIe device in the extended domain, so that the translation unit 802 may perform address translation on the configuration space address of the PCIe device in the extended domain according to a correspondence between the configuration space address and a BDF of the PCIe device in the extended domain, to obtain the BDF of the PCIe device in the extended domain; the sending unit 803 may send, according to the BDF of the PCIe device in the extended domain and the message body, the analog access packet corresponding to the access packet, to implement configuration space access of the PCIe device in the extended domain.

The access target address may be a first MMIO address of the PCIe device in the extended domain, so that the translation unit 802 may perform address translation on the first MMIO address of the PCIe device in the extended domain according to a mapping between the first MMIO address and a second MMIO address of the PCIe device in the extended domain, to obtain the second MMIO address of the PCIe device in the extended domain; the sending unit 803 may send, according to the second MMIO address of the PCIe device in the extended domain and the message body, the analog access packet corresponding to the access packet, to implement MMIO access of the PCIe device in the extended domain.

The access target address may be a second MSI address of the PCIe device in the extended domain, so that the translation unit 802 may perform address translation on the second MSI address of the PCIe device in the extended domain according to a mapping between a first MSI address and the second MSI address of the PCIe device in the extended domain, to obtain the first MSI address of the PCIe device in the extended domain; the sending unit 803 may send, according to the first MSI address of the PCIe device in the extended domain and the message body, the analog access packet corresponding to the access packet, to implement MSI access of the PCIe device in the extended domain.

The access target address may be a second DMA address of the PCIe device in the extended domain, so that the translation unit 802 may perform address translation on the second DMA address of the PCIe device in the extended domain according to a mapping between a first DMA address and the second DMA address of the PCIe device in the extended domain, to obtain the first DMA address of the PCIe device in the extended domain; the sending unit 803 may send, according to the first DMA address of the PCIe device in the extended domain and the message body, the analog access packet corresponding to the access packet, to implement DMA access of the PCIe device in the extended domain.

In this embodiment of the present invention, the receiving unit 801 may receive the access packet, where the access packet is a packet for mutual communication between the primary domain and the extended domain, and the translation unit 802 may perform address translation on the access target address of the access packet according to the pre-saved address mapping, to obtain the translated access target address, and the analog access packet corresponding to the access packet is sent, where the analog access packet carries the translated access target address, so that the root complex in the primary domain or the CPU can access the PCIe device in the extended domain, or the PCIe device in the extended domain can perform DMA access or MSI access, to implement communication between the CPU in the system or the primary domain and the extended domain, complete extension of a PCIe domain in the system, implement communication of an extended PCIe domain, and solve a problem in the prior art that a PCIe domain cannot be extended, so that the number of PCIe devices in the system is not restricted by 256 buses.

Figure 9:
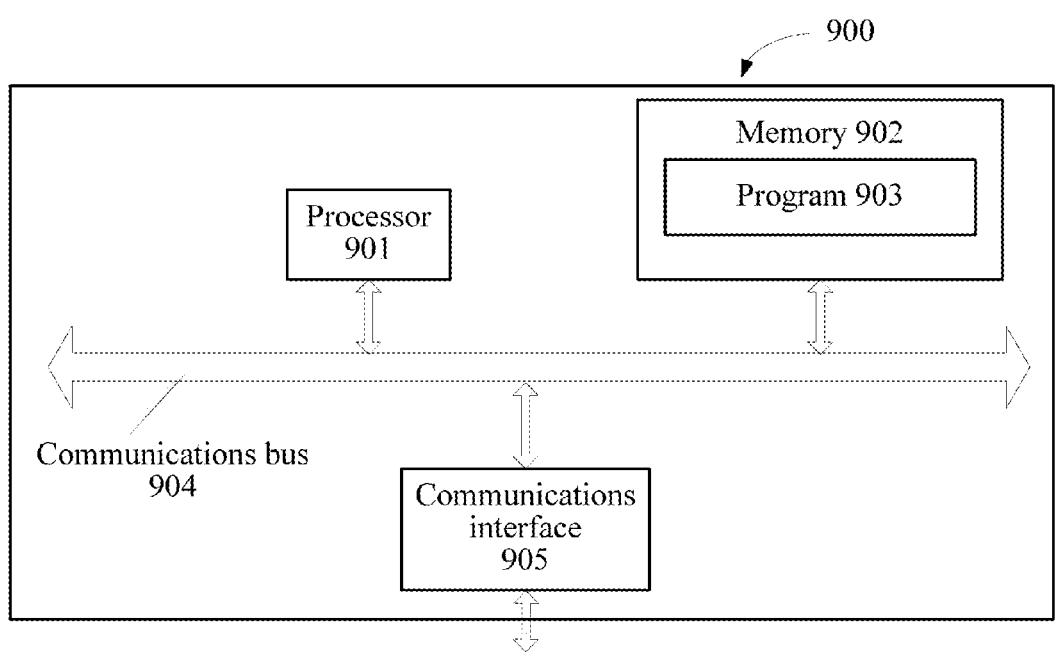
FIG. 9 is a schematic structural composition diagram of still another apparatus according to an embodiment of the present invention.

FIG. 9 is a schematic structural composition diagram of an apparatus for extending a PCIe domain according to an embodiment of the present invention. The apparatus for extending a PCIe domain is used for a system including a primary domain and an extended domain, where the primary domain includes a root complex and a PCIe device, where the PCIe device in the primary domain has a first bus set; and the extended domain includes a root complex endpoint device and a PCIe device, where the PCIe device in the extended domain has a second bus set, the first bus set is different from the second bus set, and the root complex endpoint device is the PCIe device in the primary domain and a root complex in the extended domain.

The apparatus for extending a PCIe domain may include a processor 901, a memory 902, a system bus 904, and a communications interface 905. The processor 901, the memory 902, and the communications interface 905 are connected and complete mutual communication by using the system bus 904.

The processor 901 may be a single-core or multi-core central processing unit, an application-specific integrated circuit, or one or more integrated circuits configured to implement this embodiment of the present invention.

The memory 902 may be a high-speed random access memory (RAM) memory, or a non-volatile memory, such as at least one magnetic disk memory.

The memory 902 is configured to store a computer executable instruction 903. Specifically, the computer executable instruction 903 may include program code.

When the apparatus for extending a PCIe domain runs, the processor 901 runs the computer executable instruction 903, and may execute the method procedure shown in FIG. 2 or FIG. 3A and FIG. 3B.

An embodiment of the present invention provides an apparatus for accessing a PCIe domain, and a schematic structural composition diagram of the apparatus is shown in FIG. 9. The apparatus is used for a system including a primary domain and an extended domain, where the primary domain includes a root complex and a PCIe device, where the PCIe device in the primary domain has a first bus set; and the extended domain includes a root complex endpoint device and a PCIe device, where the PCIe device in the extended domain has a second bus set, the first bus set is different from the second bus set, and the root complex endpoint device is the PCIe device in the primary domain and a root complex in the extended domain.

The apparatus may include a processor 901, a memory 902, a system bus 904, and a communications interface 905. The processor 901, the memory 902, and the communications interface 905 are connected and complete mutual communication by using the system bus 904.

The processor 901 may be a single-core or multi-core central processing unit, an application-specific integrated circuit, or one or more integrated circuits configured to implement this embodiment of the present invention.

The memory 902 may be a high-speed RAM memory, or a non-volatile memory, such as at least one magnetic disk memory.

The memory 902 is configured to store a computer executable instruction 903. Specifically, the computer executable instruction 903 may include program code.

When the apparatus runs, the processor 901 runs the computer executable instruction 903, and may execute the method procedure shown in FIG. 4 or the method procedure described in the following.

S901: Receive an access packet, where the access packet is a packet for mutual communication between the primary domain and the extended domain, the access packet carries a message body and an access target address, the access target address is a configuration space address of the PCIe device in the extended domain, a first MMIO address of the PCIe device in the extended domain, a second MSI address of the PCIe device in the extended domain, or a second DMA address of the PCIe device in the extended domain, and the configuration space address of the PCIe device in the extended domain and the first MMIO address of the PCIe device in the extended domain belong to a memory address of the RCEP.

S902: Perform address translation on the access target address according to an address mapping, to obtain a translated access target address, where the address mapping is pre-saved in the RCEP, and the address mapping includes a correspondence between the configuration space address and a BDF of the PCIe device in the extended domain, a mapping between the first MMIO address and a second MMIO address of the PCIe device in the extended domain, a mapping between a first MSI address and the second MSI address of the PCIe device in the extended domain, or a mapping between a first DMA address and the second DMA address of the PCIe device in the extended domain.

S903: Send an analog access packet corresponding to the access packet, where the analog access packet carries the message body and the translated access target address.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a RAM, a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for extending a Peripheral Component Interconnect Express (PCIe) domain, wherein the method is implemented in a system comprising a primary domain and an extended domain, wherein the primary domain comprises a first root complex and a first PCIe device, wherein the first PCIe device in the primary domain has a first bus set, wherein the extended domain comprises a root complex endpoint device and a second PCIe device, wherein the second PCIe device in the extended domain has a second bus set, wherein the first bus set is different from the second bus set, wherein the root complex endpoint device comprises the first PCIe device in the primary domain and a second root complex in the extended domain, and wherein the method comprises:
    allocating a configuration space address to the second PCIe device in the extended domain from a memory address of the root complex endpoint device;
    establishing a correspondence between the configuration space address and a bus number/device number/function number (BDF); and
    allocating, from the second bus set, a bus number to the second PCIe device discovered in the extended domain, wherein the bus number is used for determining the BDF of the second PCIe device discovered in the extended domain so as to implement, according to the correspondence between the configuration space address and the BDF and by using the BDF of the second PCIe device discovered in the extended domain, configuration space access of the second PCIe device discovered in the extended domain.

2. The method according to claim 1, wherein the method further comprises:
    allocating, from the memory address of the root complex endpoint device, a first memory-mapped input/output address to the second PCIe device discovered in the extended domain; and
    allocating, according to the first memory-mapped input/output address, a second memory-mapped input/output address to the second PCIe device discovered in the extended domain, so as to implement, according to a mapping between the first memory-mapped input/output address and the second memory-mapped input/output address, memory-mapped input/output access of the second PCIe device discovered in the extended domain.

3. The method according to claim 2, wherein the allocating, according to the first memory-mapped input/output address, a second memory-mapped input/output address to the second PCIe device discovered in the extended domain comprises:
    establishing the mapping between the first memory-mapped input/output address and the second memory-mapped input/output address; and
    allocating, according to the mapping between the first memory-mapped input/output address and the second memory-mapped input/output address, the second memory-mapped input/output address to the second PCIe device discovered in the extended domain.

4. The method according to claim 3, wherein the method further comprises determining a size of a base address register of the second PCIe device discovered in the extended domain, wherein allocating the first memory-mapped input/output address to the second PCIe device discovered in the extended domain comprises allocating, according to the size of the base address register of the second PCIe device discovered in the extended domain, the first memory-mapped input/output address to the second PCIe device discovered in the extended domain.

5. The method according to claim 3, wherein the method further comprises: establishing and saving a correspondence between an identifier of the second PCIe device discovered in the extended domain and the first memory-mapped input/output address of the second PCIe device discovered in the extended domain, so as to obtain, according to the identifier of the second PCIe device discovered in the extended domain, the first memory-mapped input/output address of the second PCIe device discovered in the extended domain, to perform memory-mapped input/output access.

6. The method according to claim 1, wherein the method further comprises:
allocating a first message signaled interrupts address to the second PCIe device in the extended domain from the memory address of the root complex endpoint device; and
allocating a second message signaled interrupts address to the second PCIe device in the extended domain according to the first message signaled interrupts address, so as to implement message signaled interrupts access of the second PCIe device in the extended domain according to a mapping between the first message signaled interrupts address and the second message signaled interrupts address.

7. The method according to claim 1, wherein the method further comprises:
allocating a first direct memory access address to the second PCIe device in the extended domain from the memory address of the root complex endpoint device; and
allocating a second direct memory access address to the second PCIe device in the extended domain according to the first direct memory access address, so as to implement direct memory access of the second PCIe device in the extended domain according to a mapping between the first direct memory access address and the second direct memory access address.

8. A method for accessing a Peripheral Component Interconnect Express (PCIe) domain, wherein the method is implemented in a system comprising a primary domain and an extended domain, wherein the primary domain comprises a first root complex and a first PCIe device, wherein the first PCIe device in the primary domain has a first bus set, wherein the extended domain comprises a root complex endpoint device and a second PCIe device, wherein the second PCIe device in the extended domain has a second bus set, wherein the first bus set is different from the second bus set, and wherein the root complex endpoint device comprises the PCIe device in the primary domain and a second root complex in the extended domain, and wherein the method comprises:
receiving, by the root complex endpoint device, an access packet, wherein the access packet is a packet for mutual communication between the primary domain and the extended domain, and wherein the access packet carries a message body and an access target address;
performing, by the root complex endpoint device, address translation on the access target address according to an address mapping to obtain a translated access target address, wherein the address mapping is pre-saved in the root complex endpoint device; and
sending, by the root complex endpoint device, an analog access packet corresponding to the access packet, wherein the analog access packet carries the message body and the translated access target address.

9. The method according to claim 8, wherein the access target address is a configuration space address of the second PCIe device in the extended domain, wherein the address mapping is a correspondence between the configuration space address and a bus number/device number/function number BDF of the second PCIe device in the extended domain, and wherein performing, by the root complex endpoint device, the address translation on the access target address according to the address mapping, to obtain the translated access target address comprises performing, by the root complex endpoint device, address translation on the configuration space address of the second PCIe device in the extended domain according to the correspondence between the configuration space address and the BDF of the second PCIe device in the extended domain, to obtain the BDF of the second PCIe device in the extended domain.

10. The method according to claim 8, wherein the access target address is a first memory-mapped input/output address of the second PCIe device in the extended domain, wherein the address mapping is a mapping between the first memory-mapped input/output address and a second memory-mapped input/output address of the second PCIe device in the extended domain, and wherein performing, by the root complex endpoint device, the address translation on the access target address according to the address mapping, to obtain the translated access target address comprises performing, by the root complex endpoint device, address translation on the first memory-mapped input/output address of the second PCIe device in the extended domain according to the mapping between the first memory-mapped input/output address and the second memory-mapped input/output address of the second PCIe device in the extended domain, to obtain the second memory-mapped input/output address of the second PCIe device in the extended domain.

11. The method according to claim 8, wherein the access target address is a second message signaled interrupts address of the second PCIe device in the extended domain, wherein the address mapping is a mapping between a first message signaled interrupts address and the second message signaled interrupts address of the second PCIe device in the extended domain, and wherein performing, by the root complex endpoint device, the address translation on the access target address according to the address mapping, to obtain the translated access target address comprises performing, by the root complex endpoint device, address translation on the second message signaled interrupts address of the second PCIe device in the extended domain according to the mapping between the first message signaled interrupts address and the second message signaled interrupts address of the second PCIe device in the extended domain, to obtain the first message signaled interrupts address of the second PCIe device in the extended domain.

12. The method according to claim 8, wherein the access target address is a second direct memory access address of the second PCIe device in the extended domain, wherein the address mapping is a mapping between a first direct memory access address and the second direct memory access address of the second PCIe device in the extended domain, and wherein performing, by the root complex endpoint device, the address translation on the access target address according to the address mapping, to obtain the translated access target address comprises performing, by the root complex endpoint device, address translation on the second direct memory access address of the second PCIe device in the extended domain according to the mapping between the first direct memory access address and the second direct memory access address of the second PCIe device in the extended domain, to obtain the first direct memory access address of the second PCIe device in the extended domain.

13. A Peripheral Component Interconnect Express (PCIe) domain system, comprising:
a primary domain comprising a first root complex and a first PCIe device, wherein the PCIe device in the primary domain has a first bus set; and
an extended domain comprising a root complex endpoint device and a second PCIe device, wherein the second PCIe device in the extended domain has a second bus set, wherein the first bus set is different from the second bus set, wherein the root complex endpoint device comprises the first PCIe device in the primary domain and a second root complex in the extended domain, and wherein the PCIe domain system is configured to:
  allocate a configuration space address to the second PCIe device in the extended domain from a memory address of the root complex endpoint device;
  establish a correspondence between the configuration space address and a bus number/device number/function number (BDF); and
  allocate, from the second bus set, a bus number to the second PCIe device discovered in the extended domain, wherein the bus number is used for determining the BDF of the second PCIe device discovered in the extended domain so as to implement, according to the correspondence between the configuration space address and the BDF and by using the BDF of the second PCIe device discovered in the extended domain, configuration space access of the second PCIe device discovered in the extended domain.

14. The system according to claim 13, wherein the system is further configured to:
  allocate, from the memory address of the root complex endpoint device, a first memory-mapped input/output address to the second PCIe device discovered in the extended domain; and
  allocate, according to the first memory-mapped input/output address, a second memory-mapped input/output address to the second PCIe device discovered in the extended domain, so as to implement, according to a mapping between the first memory-mapped input/output address and the second memory-mapped input/output address, memory-mapped input/output access of the PCIe device discovered in the extended domain.

15. The system according to claim 13, wherein the process of allocating, according to the first memory-mapped input/output address, the second memory-mapped input/output address to the second PCIe device discovered in the extended domain comprises:
  establishing the mapping between the first memory-mapped input/output address and the second memory-mapped input/output address; and
  allocating, according to the mapping between the first memory-mapped input/output address and the second memory-mapped input/output address, the second memory-mapped input/output address to the second PCIe device discovered in the extended domain.

16. The system according to claim 15, wherein the system is further configured to determine a size of a base address register of the second PCIe device discovered in the extended domain, wherein allocating the first memory-mapped input/output address to the PCIe device discovered in the extended domain comprises allocating, according to the size of the base address register of the second PCIe device discovered in the extended domain, the first memory-mapped input/output address to the second PCIe device discovered in the extended domain.

17. The system according to 13, wherein the system is further configured to:
  allocate a first message signaled interrupts address to the second PCIe device in the extended domain from the memory address of the root complex endpoint device; and
  allocate a second message signaled interrupts address to the second PCIe device in the extended domain according to the first message signaled interrupts address, so as to implement message signaled interrupts access of the second PCIe device in the extended domain according to a mapping between the first message signaled interrupts address and the second message signaled interrupts address.

18. The system according to claim 13, wherein the system is further configured to:
  allocate a first direct memory access address to the second PCIe device in the extended domain from the memory address of the root complex endpoint device; and
  allocate a second direct memory access address to the second PCIe device in the extended domain according to the first direct memory access address, so as to implement direct memory access of the second PCIe device in the extended domain according to a mapping between the first direct memory access address and the second direct memory access address.

19. A Peripheral Component Interconnect Express (PCIe) domain system comprising:
  a primary domain comprising a first root complex and a first PCIe device, wherein the first PCIe device in the primary domain has a first bus set; and
  an extended domain comprising a root complex endpoint device and a second PCIe device, wherein the second PCIe device in the extended domain has a second bus set, wherein the first bus set is different from the second bus set, wherein the root complex endpoint device comprises the first PCIe device in the primary domain and a second root complex in the extended domain, and wherein the PCIe domain system is configured to:
    receive, by the root complex endpoint device, an access packet, wherein the access packet is a packet for mutual communication between the primary domain and the extended domain, and wherein the access packet carries a message body and an access target address;
    perform, by the root complex endpoint device, address translation on the access target address according to an address mapping to obtain a translated access target address, wherein the address mapping is pre-saved in the root complex endpoint device; and
    send, by the root complex endpoint device, an analog access packet corresponding to the access packet, wherein the analog access packet carries the message body and the translated access target address.

20. The system according to claim 19, wherein the access target address is a configuration space address of the second PCIe device in the extended domain, wherein the address mapping is a correspondence between the configuration space address and a bus number/device number/function number (BDF) of the second PCIe device in the extended domain, and wherein the process of performing, by the root complex endpoint device, the address translation on the access target address according to the address mapping, to obtain the translated access target address comprises performing, by the root complex endpoint device, address translation on the configuration space address of the second PCIe device in the extended domain according to the correspondence between the configuration space address and the BDF of the second PCIe device in the extended domain, to obtain the BDF of the second PCIe device in the extended domain.

21. The system according to claim 19, wherein the access target address is a first memory-mapped input/output address of the second PCIe device in the extended domain, and wherein the address mapping is a mapping between the first memory-mapped input/output address and a second memory-mapped input/output address of the second PCIe device in the extended domain, and the process of performing, by the root complex endpoint device, the address translation on the access target address according to the address mapping, to obtain the translated access target address comprises performing, by the root complex endpoint device, address translation on the first memory-mapped input/output address of the second PCIe device in the extended domain according to the mapping between the first memory-mapped input/output address and the second memory-mapped input/output address of the second PCIe device in the extended domain, to obtain the second memory-mapped input/output address of the second PCIe device in the extended domain.

22. The system according to claim 19, wherein the access target address is a second message signaled interrupts address of the second PCIe device in the extended domain, wherein the address mapping is a mapping between a first message signaled interrupts address and the second message signaled interrupts address of the second PCIe device in the extended domain, and wherein the process of performing, by the root complex endpoint device, the address translation on the access target address according to the address mapping, to obtain the translated access target address comprises performing, by the root complex endpoint device, address translation on the second message signaled interrupts address of the second PCIe device in the extended domain according to the mapping between the first message signaled interrupts address and the second message signaled interrupts address of the second PCIe device in the extended domain, to obtain the first message signaled interrupts address of the second PCIe device in the extended domain.

23. The system according to claim 19 wherein the access target address is a second direct memory access address of the second PCIe device in the extended domain, wherein the address mapping is a mapping between a first direct memory access address and the second direct memory access address of the second PCIe device in the extended domain, and wherein the process of performing, by the root complex endpoint device, the address translation on the access target address according to the address mapping, to obtain the translated access target address comprises performing, by the root complex endpoint device, address translation on the second direct memory access address of the second PCIe device in the extended domain according to the mapping between the first direct memory access address and the second direct memory access address of the second PCIe device in the extended domain, to obtain the first direct memory access address of the second PCIe device in the extended domain.

* * * * *